(12) United States Patent
Kamegai et al.

(10) Patent No.: US 8,240,395 B2
(45) Date of Patent: Aug. 14, 2012

(54) HAND-HELD POWER TOOL

(75) Inventors: Hikaru Kamegai, Anjo (JP); Takuo Arakawa, Anjo (JP)

(73) Assignee: Makita Corporation, Anjo-shi (JP)

( * ) Notice: Subject to any disclaimer, the term of this patent is extended or adjusted under 35 U.S.C. 154(b) by 112 days.

(21) Appl. No.: 12/733,619

(22) PCT Filed: Sep. 17, 2008

(86) PCT No.: PCT/JP2008/066780
§ 371 (c)(1),
(2), (4) Date: Apr. 27, 2010

(87) PCT Pub. No.: WO2009/038101
PCT Pub. Date: Mar. 26, 2009

(65) Prior Publication Data
US 2010/0206596 A1    Aug. 19, 2010

(30) Foreign Application Priority Data

Sep. 18, 2007  (JP) ................................ 2007-241286
May 30, 2008  (JP) ................................ 2008-143593

(51) Int. Cl.
*B25D 17/24* (2006.01)
(52) U.S. Cl. .................................. 173/162.2; 173/162.1
(58) Field of Classification Search ............... 173/162.1, 173/162.2, 49, 210, 211; 16/421, 431
See application file for complete search history.

(56) References Cited

U.S. PATENT DOCUMENTS

| | | | |
|---|---|---|---|
| 2,189,870 A | 2/1940 | Sluyter | |
| 2,819,063 A | 1/1958 | Neidhart | |
| 4,401,167 A | 8/1983 | Sekizawa et al. | |
| 5,522,466 A * | 6/1996 | Harada et al. | 173/162.2 |
| 5,692,574 A * | 12/1997 | Terada | 173/162.2 |
| 5,927,407 A | 7/1999 | Gwinn et al. | |

(Continued)

FOREIGN PATENT DOCUMENTS

CN    1121457 A    5/1996

(Continued)

OTHER PUBLICATIONS

International Preliminary Report on Patentability dated on Apr. 7, 2010 in International Patent Application No. PCT/JP2008/066780.

(Continued)

*Primary Examiner* — Paul R Durand
*Assistant Examiner* — Nathaniel Chukwurah
(74) *Attorney, Agent, or Firm* — Oliff & Berridge, PLC

(57) ABSTRACT

Improving vibration reduction of a handle in a hand-held power tool by performing a predetermined operation on a workpiece by linear movement of a tool bit in an axial direction. The power tool includes a power tool body, a handle and a vibration-proofing part. The vibration-proofing part includes an elastic element that is disposed between the power tool body and the handle and reduces transmission of vibration from the power tool body to the handle, and also includes a body-side receiving part and a handle-side receiving part which are opposed to each other so as to hold the elastic element. The vibration-proofing part is designed such that deformation of the elastic element is shearing deformation in each of the direction of a z-axis defined along the axial direction of the tool bit and the directions of a y-axis and an x-axis which intersect with the z-axis.

18 Claims, 20 Drawing Sheets

U.S. PATENT DOCUMENTS

| | | | |
|---|---|---|---|
| 2005/0082072 A1* | 4/2005 | Nicolantonio et al. | 173/162.2 |
| 2005/0087353 A1* | 4/2005 | Oki et al. | 173/162.2 |
| 2007/0289762 A1 | 12/2007 | Kikukchi et al. | |

FOREIGN PATENT DOCUMENTS

| | | |
|---|---|---|
| CN | 1593854 A | 3/2005 |
| EP | 1 867 442 A2 | 6/2007 |
| JP | B2-58-34271 | 7/1983 |
| JP | U-7-20275 | 4/1995 |
| JP | A-8-126975 | 5/1996 |
| JP | A-2000-176864 | 6/2000 |
| JP | A-2005-81517 | 3/2005 |
| JP | A-2007-331072 | 12/2007 |
| JP | A-2008-183683 | 8/2008 |
| WO | WO 2008/099744 A1 | 8/2008 |

OTHER PUBLICATIONS

International Search Report issued on Jan. 6, 2009 in International Application No. PCT/JP2008/066780 (with translation).

Chinese Office Action issued in Chinese Application No. 2008801107587.9 dated May 20, 2011 (with translation).

Extended European Search Report issued in European Application No. 08831330.9 dated Jul. 15, 2011.

* cited by examiner

HAND-HELD POWER TOOL

FIELD OF THE INVENTION

The present invention relates to a vibration-proofing structure of a handle in a hand-held power tool, such as a hammer and a hammer drill, which drives a tool bit to reciprocate in a constant cycle.

BACKGROUND OF THE INVENTION

According to a known hand-held power tool such as a hammer with a vibration-proof handle, the handle is connected to the power tool body via an elastic rubber, in order to reduce transmission of vibration from a power tool body to the handle. For example, Japanese non-examined laid-open Patent Publication No. 58-34271 discloses such a power tool. An elastic rubber has lower shearing stiffness compared with its compressive stiffness. Thus, it has a property that a higher vibration reducing effect can be obtained by shearing deformation than by compressive deformation. In the above-mentioned known power tool, transmission of vibration from a power tool body to a handle is reduced in the longitudinal direction of the power tool body (horizontal direction) and in the vertical direction transverse to the longitudinal direction by utilizing a vibration damping action caused by shearing deformation of the rubber.

According to such known vibration-proofing structure, however, the shearing direction of the elastic element is limited to the longitudinal direction of the power tool body or the horizontal direction and the vertical direction transverse to the longitudinal direction, so that the effect of reducing vibration in the other directions is low. Therefore, further improvement is desired in this respect.

SUMMARY OF THE INVENTION

Accordingly, it is an object of the invention to improve vibration reduction of a handle in a hand-held power tool.

In order to solve the above-described problem, in a preferred embodiment according to the invention, a hand-held power tool performs a predetermined operation on a workpiece by linear movement of a tool bit in an axial direction of the tool bit. The power tool includes a power tool body having a tip end region to which the tool bit can be mounted, a handle that is disposed at a rear of the power tool body on the side opposite from the tool bit and designed to be held by a user, an elastic element that is disposed between the power tool body and the handle and serves to reduce transmission of vibration from the power tool body to the handle, a body-side receiving part that is provided on the power tool body and supports the elastic element, and a handle-side receiving part that is provided on the handle and supports the elastic element. The "hand-held power tool" in this invention typically represents an impact tool, such as a hammer and a hammer drill, which performs a hammering operation or a hammer drill operation on a workpiece only by striking movement of a tool bit in its axial direction, or by striking movement and rotation of a tool bit. In addition to the impact tool, however, it also widely includes a cutting power tool, such as a reciprocating saw and a jig saw, which performs a cutting operation on a workpiece by reciprocating movement of a blade. The "elastic element" in this invention typically represents a rubber. Further, the manner of "supporting" the elastic element in this invention suitably includes the manner in which the body-side receiving part and the handle-side receiving part are joined to the elastic element, for example, by an adhesive, the manner in which the receiving parts support the elastic element by frictional force on the contact surfaces, and the manner in which the elastic element is supported by engagement in engagement recesses formed in the receiving parts.

According to the preferred embodiment of the hand-held power tool in the invention, a vibration-proofing part is formed by the elastic element and the body-side and handle-side receiving parts which are opposed to each other so as to hold the elastic element. Further, the vibration-proofing part is designed such that deformation of the elastic element appears in the form of shearing deformation in each of the direction of a z-axis defined along the axial direction of the tool bit and the directions of a y-axis and an x-axis which intersect with the z-axis. It is only necessary for the "shearing deformation" in this invention to be included in the deformation of the elastic element, and therefore, the "shearing deformation" suitably includes deformation only by shearing deformation and deformation by shearing deformation and compressive deformation.

The elastic element has lower shearing stiffness compared with its compressive stiffness, so that a higher vibration reducing effect can be obtained by shearing deformation than by compressive deformation. In this invention, by utilizing this property of the elastic element, the vibration-proofing part which connects the power tool body and the handle is designed to reduce transmission of vibration from the power tool body to the handle in the three directions of the z-, y- and x-axes which intersect with each other, by utilizing a vibration damping action caused by shearing deformation of the elastic element. With this construction, the hand-held power tool can be provided in which vibration reduction of the handle can be realized by shearing deformation of the elastic element in the three directions of the z-, y- and x-axes, or substantially in all directions including syntheses of the directions of the z-, y- and x-axes.

According to a further embodiment of the hand-held power tool in the invention, the handle comprises a main handle that is disposed at a rear of the power tool body on the side opposite from the tool bit. According to this invention, vibration reduction of the main handle can be realized by shearing deformation of the elastic element in the three directions of the z-, y- and x-axes, or substantially in all directions including syntheses of the directions of the z-, y- and x-axes.

According to a further embodiment of the hand-held power tool in the invention, the handle comprises an auxiliary handle which is mounted to a front region of the power tool body. The "auxiliary handle" in this invention is preferably designed to be removable from the power tool body. According to this invention, vibration reduction of the auxiliary handle by utilizing shearing deformation of the elastic element can be realized in the three directions of the z-, y- and x-axes, or substantially in all directions including syntheses of the directions of the z-, y- and x-axes.

According to a further embodiment of the hand-held power tool in the invention, in the vibration-proofing part, the elastic element is disposed between the body-side receiving part and the handle-side receiving part if viewed from any section in the directions of the z-, y- and x-axes. With such a construction, according to this invention, transmission of vibration from the power tool body to the main handle or the auxiliary handle can be reduced by utilizing shearing deformation of the elastic element.

According to a further embodiment of the hand-held power tool in the invention, the main handle or the auxiliary handle is connected to the power tool body by at least two vibration-proofing parts. In each of the vibration-proofing parts, the body-side receiving part and the handle-side receiving part have respective mating surfaces which are opposed to each other via the elastic element. Further, in each of the vibration-proofing parts, the direction of a normal to the mating surface of the handle-side receiving part coincides with the direction of a normal to the mating surface of the body-side receiving part. The direction of the normal to the mating surface of the handle-side receiving part and the mating surface of the body-side receiving part in one of the vibration-proofing parts is different from the direction of the normal to the mating surface of the handle-side receiving part and the mating surface of the body-side receiving part in the other vibration-proofing part. In short, the main handle or the auxiliary handle is connected to the power tool body by at least two vibration-proofing parts, and the direction of the normal to the opposed mating surfaces of the handle-side receiving part and the body-side receiving part in the one vibration-proofing part is different from that in the other vibration-proofing part. The "mating surface" in this invention typically comprises a straight inclined surface.

According to this invention, with the construction in which the direction of the normal to the mating surfaces of the handle-side receiving part and the body-side receiving part in the one vibration-proofing part is different from that in the other vibration-proofing part, the effect of reducing vibration inputted to the main handle or the auxiliary handle from the directions of the y- and x-axes can be obtained by utilizing shearing deformation of the elastic element.

According to a further embodiment of the hand-held power tool in the invention, the body-side receiving part and the handle-side receiving part in the vibration-proofing part have respective mating surfaces which are opposed to each other via the elastic element. Further, each of the mating surfaces of the handle-side and body-side receiving parts has an inclined surface formed such that the direction of the normal to the mating surfaces is orthogonally crossed to the z-axis and obliquely crossed to the y- and x-axes.

According to this invention, a distance between supporting points of the handle-side and body-side receiving parts with respect to the elastic element, or a distance between points of input of the shearing forces of the handle-side and body-side receiving parts with respect to the elastic element can be made longer in the direction of the z-axis than in the other directions of the y- and x-axes. Specifically, the shearing deformation in the direction of the z-axis can be made larger than that in the directions of the y- and x-axes. Therefore, the effect of vibration reduction by the elastic element can be improved in the direction of the z-axis in which vibration reduction is highly required.

According to a further embodiment of the hand-held power tool in the invention, the main handle or the auxiliary handle extends in a vertical direction along the y-axis and is connected to the power tool body at upper and lower points in the extending direction on right and left sides of the y-axis by the vibration-proofing parts. The body-side receiving part and the handle-side receiving part in each of the vibration-proofing parts have respective mating surfaces which are opposed to each other via the elastic element. Further, the directions of the normals to the mating surfaces of the handle-side and body-side receiving parts of the upper and lower, right and left vibration-proofing parts are symmetrical with respect to the x-axis and the y-axis.

According to this invention, as described above, with the construction in which the main handle or the auxiliary handle is connected to the power tool body via the four symmetrically arranged upper and lower, right and left vibration-proofing parts, the effect of vibration reduction by shearing deformation of the elastic element can be produced in the vertical and lateral directions with stability.

In a preferred embodiment according to the present invention, an auxiliary handle for use with a hand-held power tool which performs a predetermined operation on a workpiece by a tool bit is provided. The auxiliary handle includes a handle body which is removably mounted to a power tool body, a grip part which is connected to the handle body and designed to be held by a user, an elastic element that is disposed between the handle body and the grip part and serves to reduce transmission of vibration from the handle body to the grip part, a body-side receiving part that is provided on the handle body and supports the elastic element, and a grip-side receiving part that is provided on the grip part and supports the elastic element. A vibration-proofing part is formed by the elastic element and the body-side and grip-side receiving parts which are opposed to each other so as to hold the elastic element. Further, the vibration-proofing part is designed such that deformation of the elastic element appears in the form of shearing deformation in each of the direction of a z-axis defined along the longitudinal direction of the power tool body and the directions of a y-axis and an x-axis which intersect with the z-axis. It is only necessary for the "shearing deformation" in this invention to be included in the deformation of the elastic element, and therefore, the "shearing deformation" suitably includes deformation only by shearing deformation and deformation by shearing deformation and compressive deformation.

The elastic element has lower shearing stiffness compared with its compressive stiffness, so that a higher vibration reducing effect can be obtained by shearing deformation than by compressive deformation. According to the auxiliary handle in this invention, by utilizing this property of the elastic element, the vibration-proofing part which connects the handle body and the grip part is designed to reduce transmission of vibration from the handle body to the grip part in the three directions of the z-, y- and x-axes which intersect with each other, by utilizing a vibration damping action caused by shearing deformation of the elastic element. With this construction, the auxiliary handle can be provided in which vibration reduction of the grip part can be realized by shearing deformation of the elastic element in the three directions of the z-, y- and x-axes, or substantially in all directions including syntheses of the directions of the z-, y- and x-axes.

According to a further embodiment of the auxiliary handle in the invention, the grip part is connected at both ends in a longitudinal direction of the grip part to the handle body via two arms which extend in parallel to each other in a direction transverse to the longitudinal direction of the grip part. Specifically, the auxiliary handle of this invention is configured as a D-shaped handle. The manner of providing the "arms" in this invention suitably includes the manner of providing the arms on the grip part side and the manner of providing the arms on the handle body side. In a construction in which the arms are provided on the handle body side, the vibration-proofing part is disposed between the arms and the grip part, while, in a construction in which the arms are provided on the grip part side, the vibration-proofing part is disposed between the arms and the handle body. Further, the manner of extending in "parallel" suitably includes the manner of extending generally in parallel. According to this invention, vibration reduction of the grip part of the D-shaped auxiliary handle can be realized by shearing deformation of the elastic element in the three directions of the z-, y- and x-axes, or substantially in all directions including syntheses of the directions of the z-, y- and x-axes.

According to a further embodiment of the auxiliary handle in the invention, one end of the grip part in the longitudinal direction is connected to the handle body, and the other end is free. Specifically, the auxiliary handle of this invention is configured as a bar-shaped handle. According to this invention, vibration reduction of the grip part of the bar-shaped auxiliary handle can be realized by shearing deformation of the elastic element in the three directions of the z-, y- and x-axes, or substantially in all directions including syntheses of the directions of the z-, y- and x-axes.

According to a further embodiment of the hand-held power tool in the invention, the vibration-proofing part includes a rotation preventing mechanism which allows at least one of the main handle and the auxiliary handle to move with respect to the power tool body in the directions of the z-, y- and x-axes by deformation of the elastic element and prevents its rotation on the y-axis.

In a construction in which the main handle or the auxiliary handle can rotate in all directions (of z-, y- and x-axes) via the vibration-proofing part, when the main handle or the auxiliary handle is acted upon by a force of rotation around its longitudinal direction or on the y-axis during operation, the main handle or the auxiliary handle may rotate on the y-axis with respect to the power tool body. If such occurs, the operation gets hard. According to this invention, however, the rotation preventing mechanism can prevent at least one of the main handle and the auxiliary handle from rotating on the y-axis with respect to the power tool body, so that the usability can be improved.

According to a further embodiment of the hand-held power tool in the invention, the rotation preventing mechanism comprises a different elastic element which is different from said elastic element and disposed in such a manner as to bridge the power tool body and at least one of the main handle and the auxiliary handle. The "different elastic element" in this invention typically represents a torsion bar. According to this invention, by additional provision of the different elastic element, the rotation preventing mechanism can be easily obtained.

According to a further embodiment of the auxiliary handle in the invention, the vibration-proofing part includes a rotation preventing mechanism which allows the grip part to move in the directions of the z-, y- and x-axes by deformation of the elastic element with respect to the handle body and prevents its rotation on the y-axis.

In a construction in which the grip part of the auxiliary handle can rotate in all directions (of z-, y- and x-axes) via the vibration-proofing part, when the grip part is acted upon by a force of rotation around its longitudinal direction or on the y-axis during operation of the hand-held power tool, the grip part may rotate on the y-axis with respect to the handle body. If such occurs, the operation gets hard. According to this invention, however, the rotation preventing mechanism can prevent the grip part from rotating on the y-axis with respect to the handle body, so that the workability can be improved. According to a further embodiment of the auxiliary handle in the invention, the rotation preventing mechanism comprises a different elastic element which is different from said elastic element and disposed in such a manner as to bridge the grip part and the handle body. The "different elastic element" in this invention typically represents a torsion bar. According to this invention, by additional provision of the different elastic element, the rotation preventing mechanism can be easily obtained.

According to this invention, a technique that contributes to further improvement of the effect of reducing vibration of a handle in a hand-held power tool is provided.

REPRESENTATIVE EMBODIMENT OF THE INVENTION (First Embodiment of the Invention)

Figure 1:
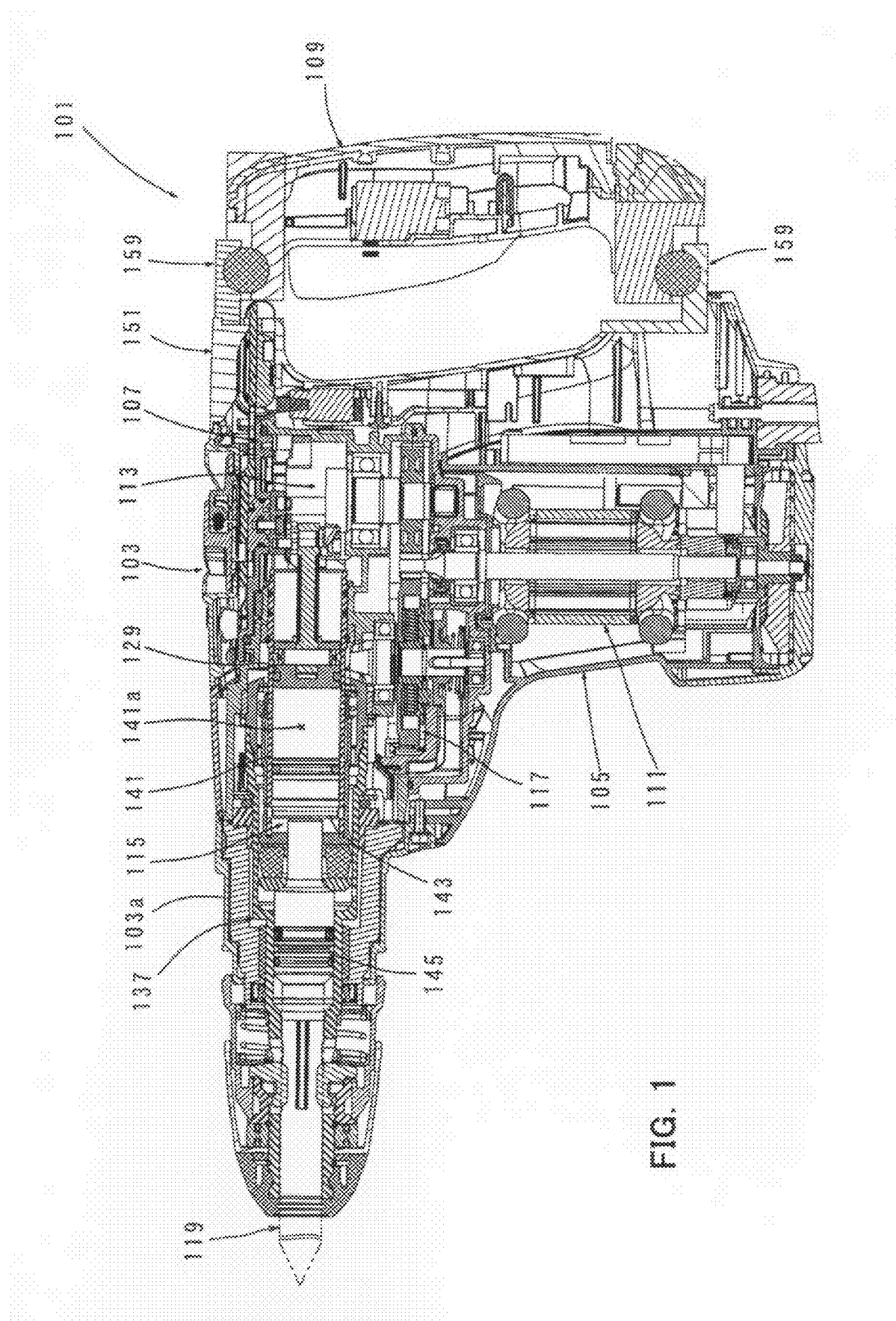
FIG. 1 is a sectional side view showing an entire electric hammer drill according to a first embodiment of this invention.

A first embodiment of the present invention is now described with reference to the drawings. FIG. 1 is a sectional side view showing an entire electric hammer drill 101 as a representative example of a hand-held power tool according to the present invention. As shown in FIG. 1, the hammer drill 101 of this embodiment includes a body 103 that forms an outer shell of the hammer drill 101, a hammer bit 119 detachably coupled to the tip end region (on the left side as viewed in FIG. 1) of the body 103 via a tool holder 137, and a handgrip 109 that is connected to the body 103 on the side opposite from the hammer bit 119 and designed to be held by a user. The body 103 and the hammer bit 119 are features that correspond to the "power tool body" and the "tool bit", respectively, according to the present invention, and the handgrip 109 is a feature that corresponds to the "handle" and the "main handle" according to the present invention. The hammer bit 119 is held by the tool holder 137 such that it is allowed to reciprocate with respect to the tool holder 137 in its axial direction and prevented from rotating with respect to the tool holder 137 in its circumferential direction. In the present embodiment, for the sake of convenience of explanation, the side of the hammer bit 119 is taken as the front and the side of the handgrip 109 as the rear.

The body 103 includes a motor housing 105 that houses a driving motor 111, and a gear housing 107 that houses a motion converting mechanism 113, a striking mechanism 115 and a power transmitting mechanism 117. The rotating output of the driving motor 111 is appropriately converted to linear motion by the motion converting mechanism 113 and then transmitted to the striking mechanism 115. As a result, an impact force is generated in the axial direction of the hammer bit 119 via the striking mechanism 115. Further, the speed of the rotating output of the driving motor 111 is appropriately reduced by the power transmitting mechanism 117 and then transmitted to the hammer bit 119. As a result, the hammer bit 119 is caused to rotate in the circumferential direction.

The motion converting mechanism 113 mainly includes a crank mechanism. The crank mechanism is designed such that, when the crank mechanism is rotationally driven by the driving motor 111, a driving element in the form of a piston 129 forming a final movable member of the crank mechanism linearly moves in the axial direction of the hammer bit. The power transmitting mechanism 117 mainly includes a gear speed reducing mechanism formed by a plurality of gears and serves to transmit the rotating force of the driving motor 111 to the tool holder 137. Thus the tool holder 137 is caused to rotate in the vertical plane, and the hammer bit 119 held by the tool holder 137 rotates.

The striking mechanism 115 mainly includes a striking element in the form of a striker 143 that is slidably disposed within the bore of the cylinder 141, and an intermediate element in the form of an impact bolt 145 that is slidably disposed within the tool holder 137. The striker 143 is driven via the action of an air spring of an air chamber 141a of the cylinder 141 which is caused by sliding movement of the piston 129. The striker 143 then collides with (strikes) an impact bolt 145 and transmits the striking force to the hammer bit 119 via the impact bolt 145.

In the hammer drill 101 thus constructed, when the driving motor 111 is driven, a striking force is applied to the hammer bit 119 in the axial direction from the motion converting mechanism 113 formed by the crank mechanism, via the striking mechanism 115, and at the same time, a rotating force is also applied to the hammer bit 119 in the circumferential direction via the power transmitting mechanism 117 formed by the gear speed reducing mechanism. Thus, the hammer bit 119 performs a drilling operation on a workpiece (concrete) by a hammering movement in the axial direction and a drilling movement in the circumferential direction.

The hammer drill 101 can be appropriately switched between a hammering operation mode in which only a striking force in the axial direction is applied to the hammer bit 119, and a hammer drill operation mode in which a striking force in the axial direction and a rotating force in the circumferential direction are applied to the hammer bit 119. This construction is not directly related to this invention and therefore will not be described.

During operation by the hammer drill 101, vibration is caused in the body 103 by the striking movement of the hammer bit 119. At this time, main vibration is caused in the axial direction of the hammer bit 119. In order to reduce transmission of vibration from the body 103 to the handgrip 109, the handgrip 109 is connected to a rear end of the body 103 via a vibration-proofing part 159. The connecting structure of the handgrip 109 is now described with reference to FIGS. 2 to 8. In the following description, a z-axis is taken along the axial direction of the hammer bit 119 or the longitudinal direction of the power tool body, a y-axis is taken along the vertical direction transverse to the z-axis, and an x-axis is taken along the horizontal direction transverse to the z-axis or the lateral direction of the power tool body.

Figure 2:
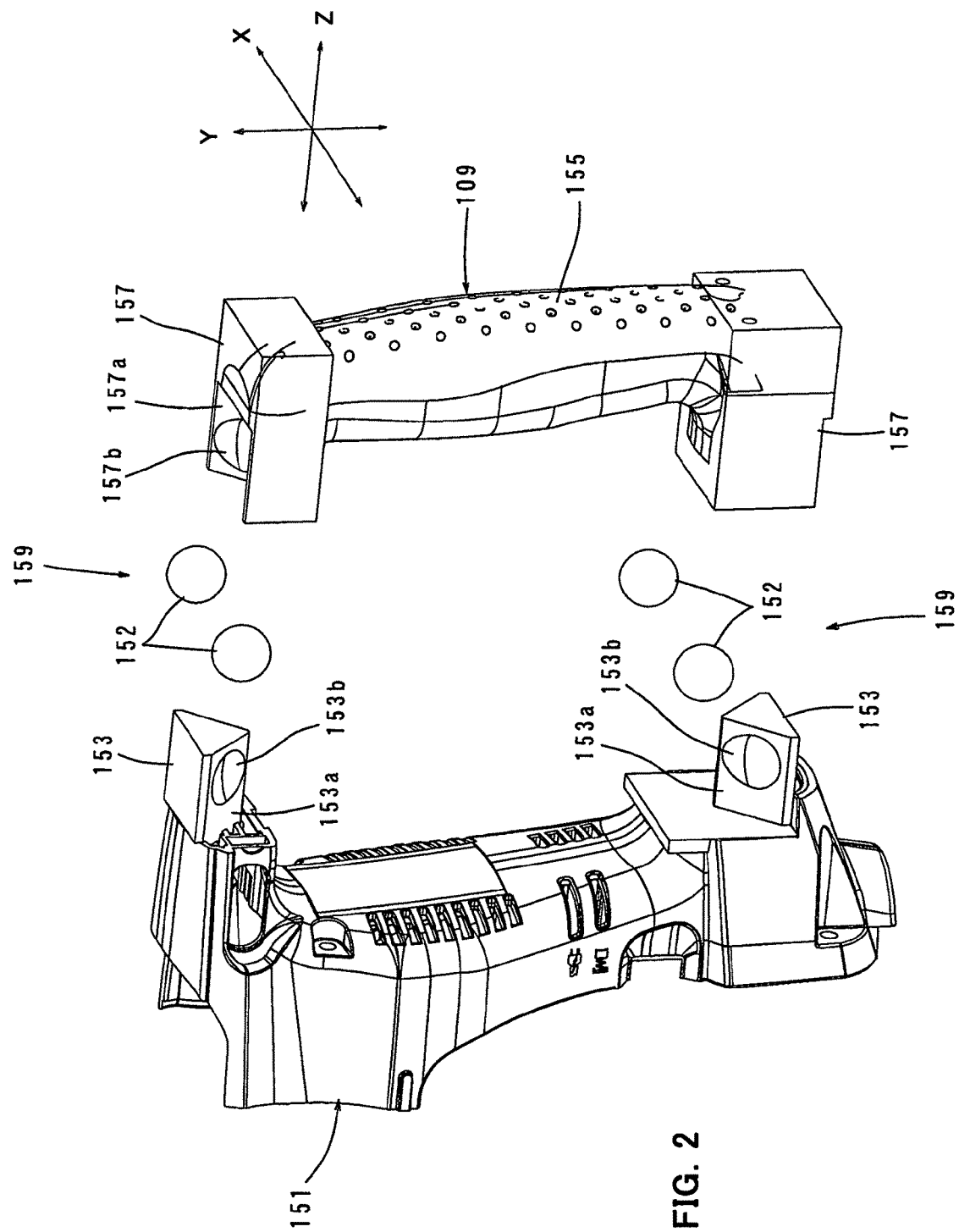
FIG. 2 is a perspective view showing a handgrip and a covering member which are not assembled together.
Figure 3:
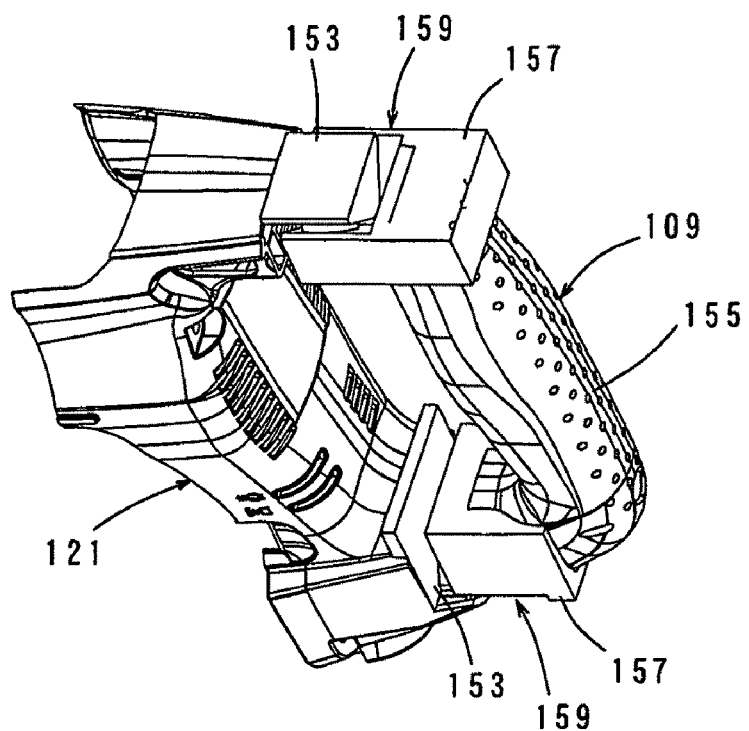
FIG. 3 is a perspective view showing the handgrip and the covering member which are assembled together.
Figure 4:
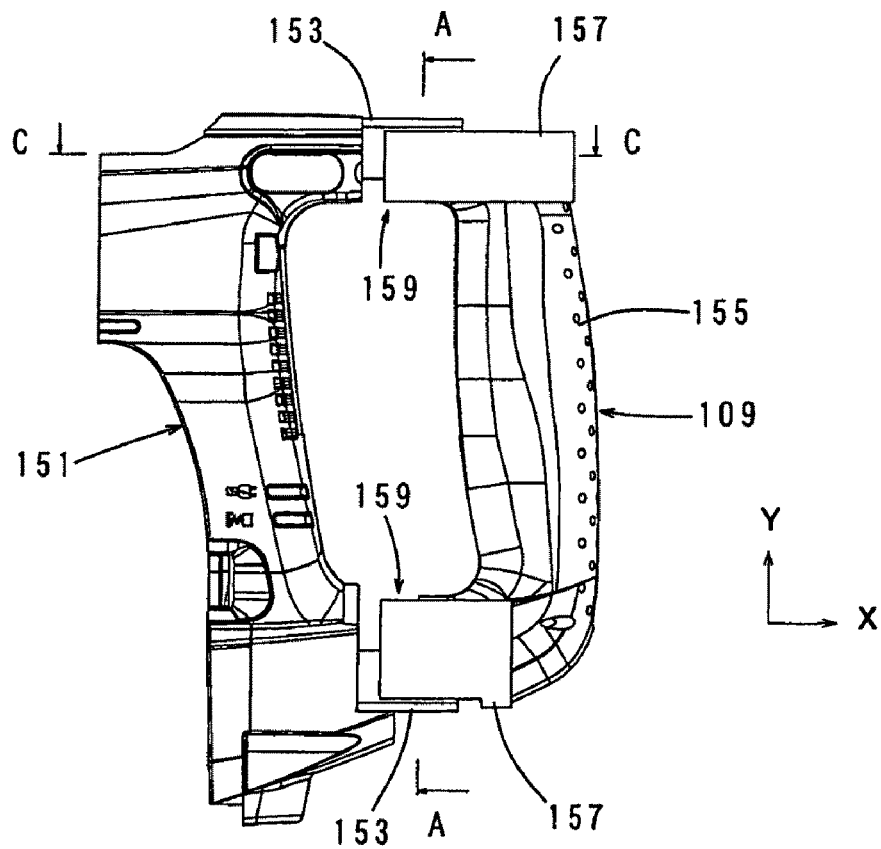
FIG. 4 is a side view showing the handgrip and the covering member which are assembled together.
Figure 5:
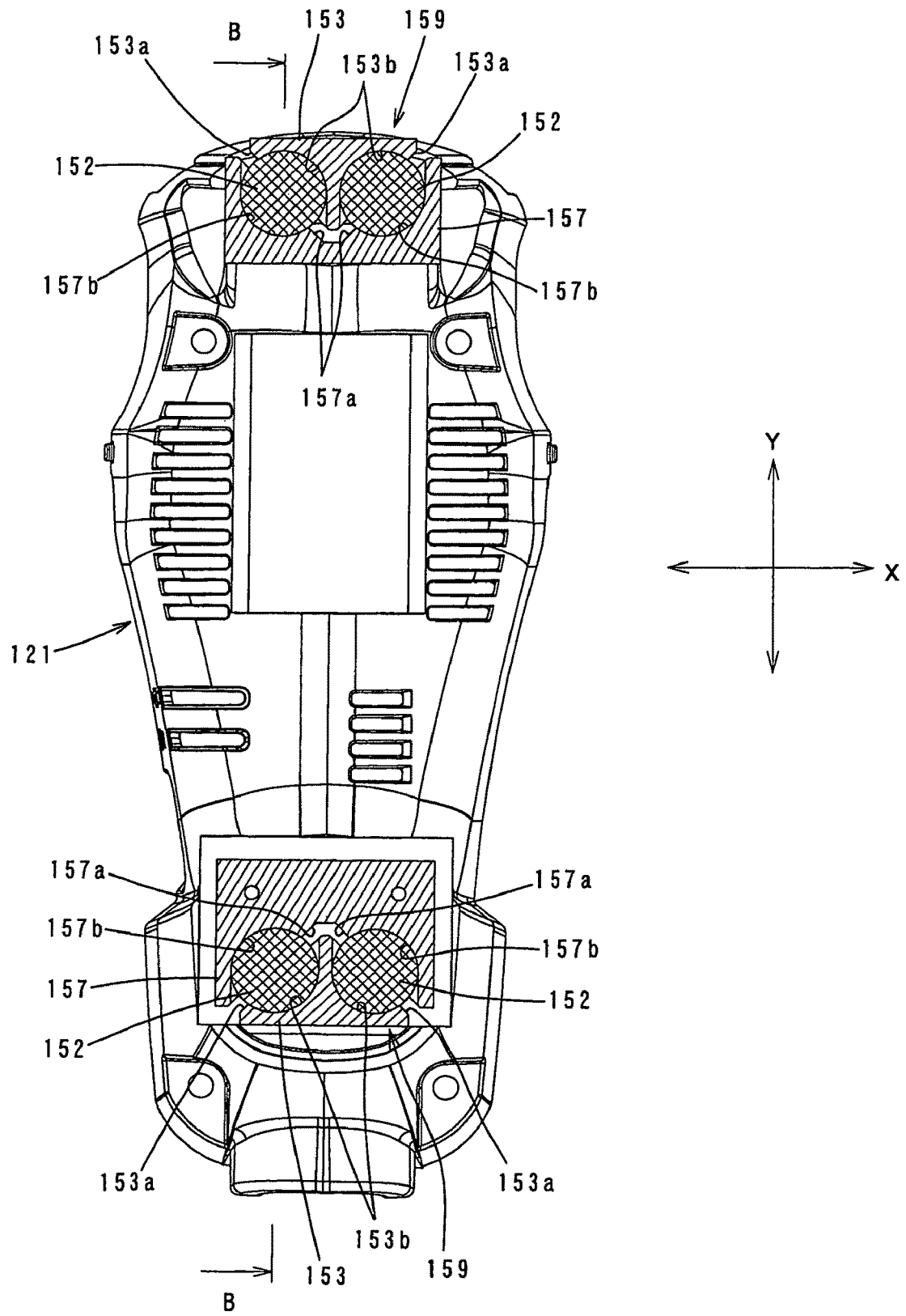
FIG. 5 is a sectional view taken along line A-A in FIG. 4.
Figure 6:
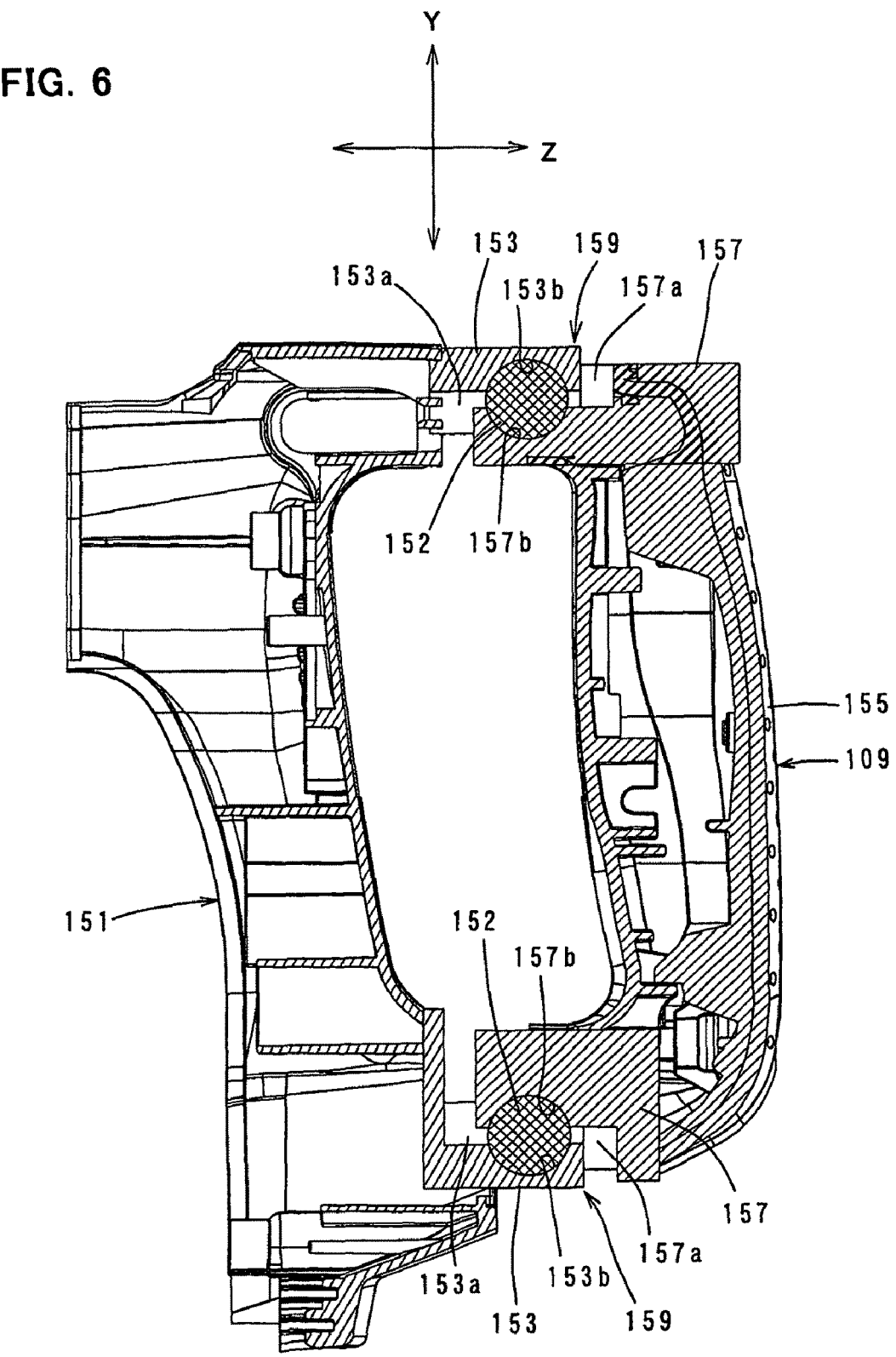
FIG. 6 is a sectional view taken along line B-B in FIG. 5.
Figure 7:
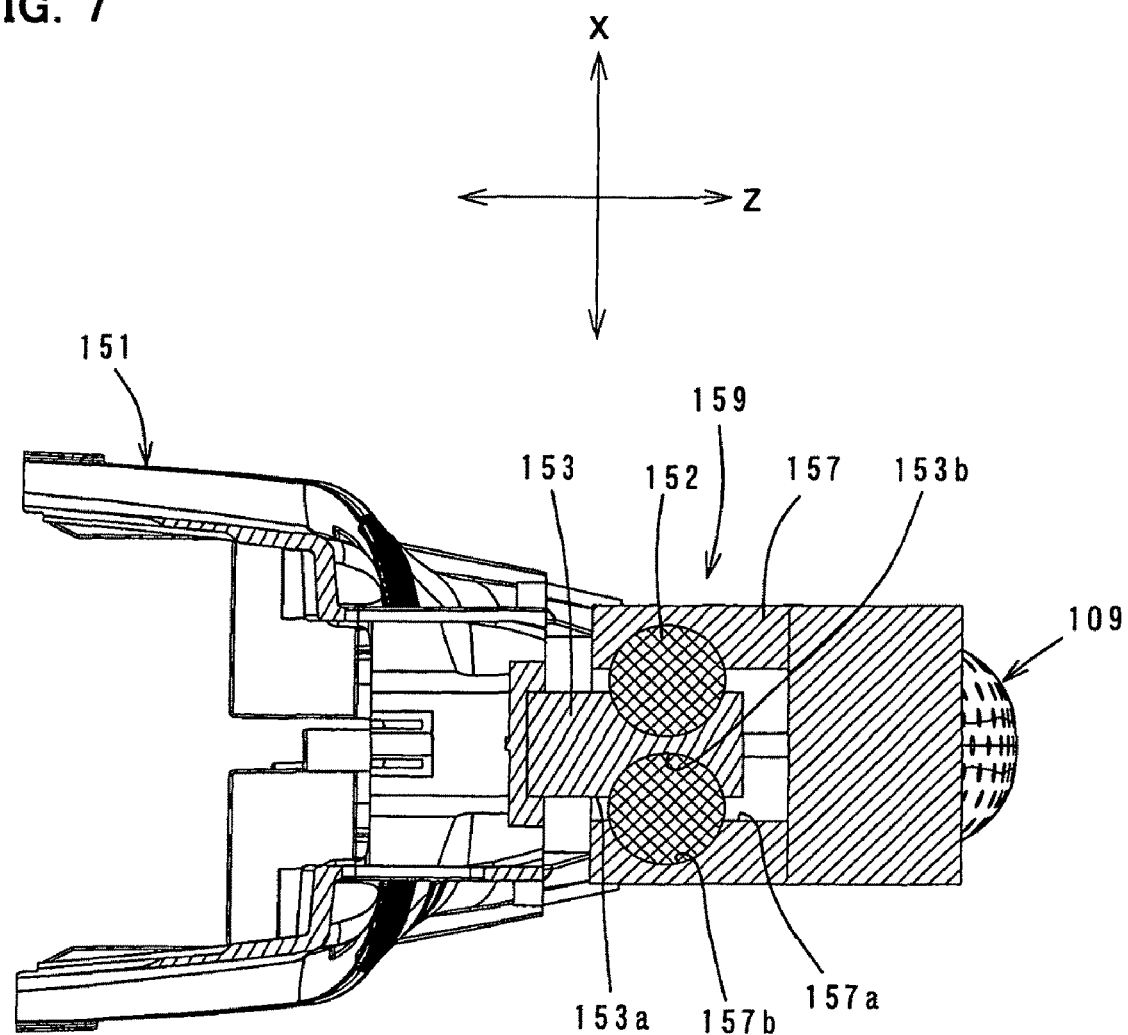
FIG. 7 is a sectional view taken along line C-C in FIG. 4.

The handgrip 109 is connected to a covering member 151 that covers a rear (right end as viewed in FIG. 1) of the body 103, via the vibration-proofing part 159 for vibration reduction. Thus, a handgrip assembly having the handgrip 109 and the covering member 151 is formed. The vibration-proofing part 159 is a feature that corresponds to the "vibration-proofing part" according to the present invention. As shown in FIGS. 1 and 3, the assembled (connected) covering member 151 is disposed on the rear end of the body 103 and fastened to the gear housing 107 and the motor housing 105 which are components of the body 103, at predetermined several points by screws (not shown). Specifically, the covering member 151 is a body-side member which is finally mounted to the body 103. FIG. 2 shows the handgrip 109 and the covering member 151 which are not assembled together, and FIGS. 3 and 4 show the handgrip 109 and the covering member 151 which are assembled (connected) together. The handgrip 109 and the covering member 151 form a closed-loop D-shaped handle.

As shown in FIG. 2, the covering member 151 extends in the direction of the y-axis and has rubber supports 153 which are provided on its upper and lower extending ends. Each of the rubber supports 153 serves to support an elastic rubber 152 for vibration reduction. The elastic rubber 152 and the rubber support 153 of the covering member 151 are features that correspond to the "elastic element" and the "body-side receiving part", respectively, according to this invention.

The handgrip 109 is generally U-shaped in side view and includes a grip part 155 extending in the direction of the y-axis and rubber supports 157 which are provided on upper and lower extending ends of the grip part 155 and support the elastic rubbers 152. The rubber supports 157 of the handgrip 109 are features that correspond to the "handle-side receiving part" according to this invention.

The covering-side rubber supports 153 and the grip-side rubber supports 157 are connected to each other via the elastic rubbers 152. Thus, the handgrip 109 is allowed to move with respect to the covering member 151 by elastic deformation of the elastic rubbers 152. In this embodiment, a total of four upper and lower, right and left vibration-proofing parts 159 including four elastic rubbers 152 and the covering-side and grip-side rubber supports 153, 157 for supporting the elastic rubbers are provided.

In this embodiment, when the handgrip 109 moves with respect to the covering member 151, elastic deformation of the elastic rubbers 152 of the vibration-proofing parts 159 includes shearing deformation in each of the directions of the z-, y- and x-axes which intersect with each other. Specifically, it is designed such that transmission of vibration from the body 103 side to the handgrip 109 can be reduced by utilizing a vibration damping action caused by shearing deformation of the elastic rubbers 152.

The construction of the vibration-proofing parts 159 provided for this purpose is now described in detail. The upper and lower covering-side rubber supports 153 protrude rearward from the rear end of the covering member 151 with a predetermined length, and the upper and lower grip-side rubber supports 157 protrude forward from the upper and lower ends of the grip part 155 with a predetermined length. The vertical distance between the grip-side rubber supports 157 is shorter than the vertical distance between the covering-side rubber supports 153, and the grip-side rubber supports 157 and the covering-side rubber supports 153 are opposed to each other in the vertical position. Specifically, the upper and lower grip-side rubber supports 157 are placed inside the upper and lower covering-side rubber supports 153. As for this inside and outside arrangement of the rubber supports, it may be designed vice versa.

In the upper vibration-proofing part 159, opposed mating surfaces 153a, 157a of the covering-side and grip-side rubber supports 153, 157 are generally V-shaped as viewed from the direction of the z-axis. In the lower vibration-proofing part 159, opposed mating surfaces 153a, 157a of the covering-side and grip-side rubber supports 153, 157 are generally inverted V-shaped as viewed from the direction of the z-axis. Specifically, the covering-side and grip-side rubber supports 153, 157 have respective mating surfaces 153a, 157a opposed to each other via the elastic rubbers 152. In the upper and lower vibration-proofing parts 159, the direction of the normal to the mating surfaces 153a of the covering-side rubber supports 153 coincides with the direction of the normal to the mating surfaces 157a of the grip-side rubber supports 157. Further, each of the mating surfaces 153a, 157a of the covering-side and grip-side rubber supports 153, 157 in the upper and lower vibration-proofing parts 159 has a straight inclined surface formed such that the direction of the normal to the mating surfaces 153a, 157a is orthogonally crossed to the z-axis (see FIGS. 6 and 7) and obliquely crossed at a predetermined angle (for example, approximately 45 degrees) to the x- and y-axes (see FIG. 5). Further, the mating surfaces 153a, 157a (inclined surfaces) of the covering-side and grip-side rubber supports 153, 157 in the vibration-proofing parts 159 are formed symmetrically with respect to the y- and x-axes.

Further, the mating surfaces 153a, 157a of the covering-side and grip-side rubber supports 153, 157 in the upper and lower vibration-proofing parts 159 are opposed to each other with a predetermined clearance. Generally semispherical engagement recesses 153b, 157b are formed in the mating surfaces 153a, 157a, respectively, and the ball-like elastic rubbers 152 are held and supported between the engagement recesses 153b, 157b. To this end, at least one of the covering-side rubber support 153 and the grip-side rubber support 157 is formed as a separate member with respect to the covering member 151 or the grip part 155 and fastened to it by screws or the like (not shown).

The hammer drill 101 according to this embodiment is constructed as described above. During hammer drill operation, impulsive and cyclic vibration is caused in the body 103, but input of this vibration from the body 103 to the handgrip 109 side is reduced by elastic deformation, or shearing deformation including compressive deformation, of the elastic rubbers 152 in the vibration-proofing parts 159.

In this embodiment, the mating surfaces 153a, 157a of the covering-side and grip-side rubber supports 153, 157 are formed such that the direction of the normal to the mating surfaces is orthogonal to the z-axis (i.e. the direction of the planes of the mating surfaces 153a, 157a is parallel to the z-axis). Therefore, when vibration is inputted from the body 103 to the handgrip 109 side in the direction of the z-axis, the covering-side rubber support 153 and the grip-side rubber support 157 move with respect to each other in the direction of the z-axis, and as a result, the elastic rubbers 152 are acted upon by a force mainly in the direction of shearing deformation via spherical contact surfaces of the engagement recesses 153b, 157b. Specifically, when vibration is inputted to the elastic rubbers 152 in the direction of the z-axis, elastic deformation of the elastic rubbers 152 appears mainly in the form of shearing deformation (partly including compressive deformation), and transmission of vibration from the body 103 to the handgrip 109 can be reduced by a vibration damping action caused by this shearing deformation. Here, the force in the direction of shearing deformation includes a force in a linearly cutting direction or in a twisting-off direction.

Thus, according to this embodiment, it is designed such that the elastic deformation of the elastic rubbers 152 significantly appears in the form of shearing deformation in the direction of the z-axis or the direction of the striking movement of the hammer bit 119 in which vibration reduction is highly required. With this construction, the effect of reducing vibration of the handgrip 109 in the direction of the z-axis can be efficiently secured.

Further, each of the mating surfaces 153a, 157a of the covering-side and grip-side rubber supports 153, 157 has an inclined surface formed such that the direction of the normal to the mating surfaces 153a, 157a is obliquely crossed at a predetermined angle to the x- and y-axes. Therefore, when vibration is caused in the body 103 in the direction of the y-axis (vertical direction) or the direction of the x-axis (lateral direction) and inputted to the elastic rubbers 152, the covering-side rubber support 153 and the grip-side rubber support 157 move with respect to each other in the direction of the y-axis or the x-axis, and as a result, the elastic rubbers 152 are acted upon by forces in the compressing direction and the shearing direction via spherical contact surfaces of the engagement recesses 153b, 157b. Specifically, when vibration is inputted to the elastic rubbers 152 in the direction of the y-axis or the x-axis, deformation of the elastic rubbers 152 appears in the both forms of compressive deformation and shearing deformation. The elastic rubbers 152 have lower shearing stiffness compared with their compressive stiffness. Therefore, in the directions of the y- and x-axes, both the effect of reducing vibration of the handgrip 109 by shearing deformation of the elastic rubbers 152 and the effect of preventing wobble of the handgrip 109 by compressive deformation can be obtained. Further, by the wobble preventing effect, operational stability (operability) can be ensured.

As described above, the elastic rubbers 152 have lower shearing stiffness compared with their compressive stiffness, so that a higher vibration reducing effect can be obtained by shearing deformation than by compressive deformation. According to this embodiment, by utilizing this property of the elastic rubbers 152, it is designed such that shearing deformation appears in the elastic rubbers 152 in the three directions of the z-, y- and x-axes. With this construction, the effect of reducing vibration of the handgrip 109 by utilizing shearing deformation of the elastic rubbers 152 can be obtained in the three directions of the z-, y- and x-axes, or substantially in all directions including syntheses of the directions of the z-, y- and x-axes.

Further, according to this embodiment, in the vibration-proofing parts 159, even if viewed from any section, the elastic rubbers 152 are disposed between the covering-side rubber supports 153 and the grip-side rubber supports 157 in the directions of the z-, y- and x-axes. Therefore, transmission of vibration from the body 103 to the handgrip 109 can be rationally reduced in all of the directions of the z-, y- and x-axes by shearing deformation of the elastic rubbers 152.

In this embodiment, the handgrip 109 is connected to the body 103 via the elastic rubbers 152 at four upper and lower, right and left points, and the opposed mating surfaces 153a, 157a of the covering-side and grip-side rubber supports 153, 157 are formed symmetrically with respect to the y- and x-axes. With this construction, the vibration reducing effect of the elastic rubbers 152 can be produced with stability in the vertical and lateral directions.

(Second Embodiment of the Invention)

Figure 8:
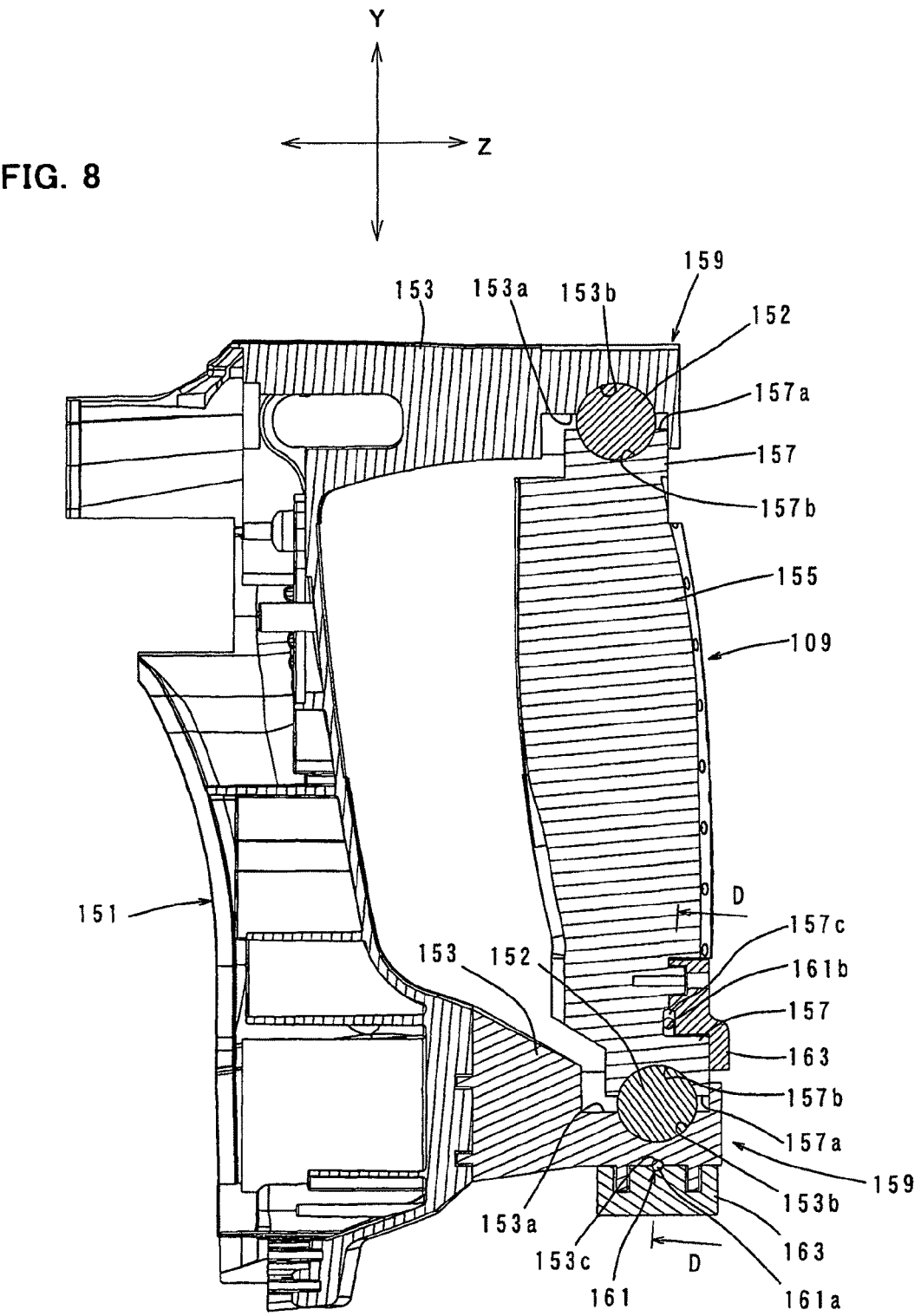
FIG. 8 is a vertical sectional view showing a D-shaped handle according to a second embodiment of this invention.
Figure 9:
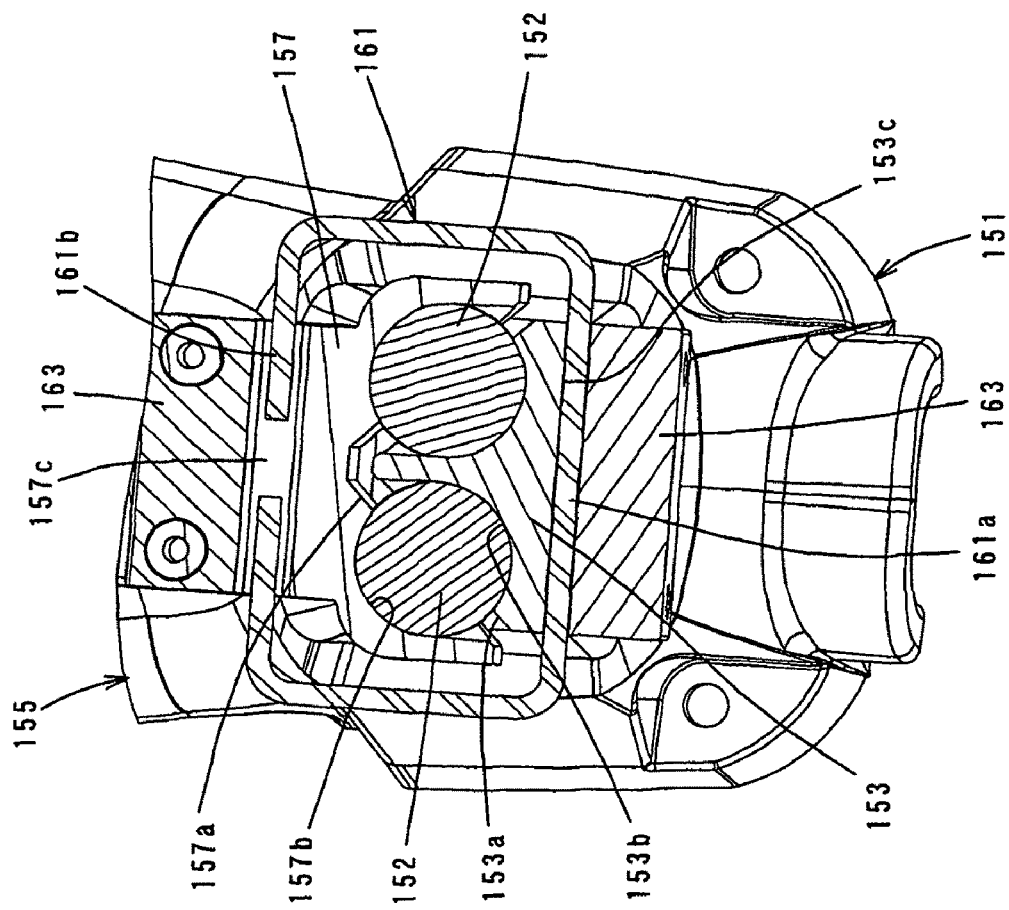
FIG. 9 is a sectional view taken along line D-D in FIG. 8.
Figure 9:
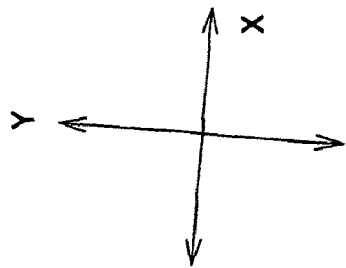

A second embodiment of the present invention is now described with reference to FIGS. 8 and 9. In the electric hammer drill according to the above-described first embodiment, in the case of the construction in which the handgrip 109 can move with respect to the covering member 151 (the body 103) via the vibration-proofing parts 159 in all directions (of z-, y- and x-axes), when the handgrip 109 is acted upon by a force of rotation around the longitudinal direction of the handgrip 109 or on the y-axis during operation, the handgrip 109 may rotate on the y-axis with respect to the covering member 151. If such a phenomenon occurs, the operation gets hard for the user.

Therefore, in the second embodiment, a torsion bar 161 is provided in order to prevent such rotation of the handgrip 109 on the y-axis. In the other points, it has substantially the same construction as the above-described first embodiment. Components which are substantially identical to those in the first embodiment are given like numerals as in the first embodiment and will not be described or briefly described. The torsion bar 161 is a feature that corresponds to the "rotation preventing mechanism" and the "different elastic element" according to this invention. FIG. 8 is a vertical sectional view showing a D-shaped handle having the handgrip 109 connected to the covering member 151 via the upper and lower vibration-proofing parts 159, and FIG. 9 is a sectional view taken along line D-D in FIG. 8.

In this embodiment, the torsion bar 161 is formed by bending a round bar of spring material into a generally rectangular shape and mounted to the lower vibration-proofing part 159. A mounting groove 153c is formed in the lower surface of the lower covering-side rubber support 153 and extends in the lateral direction (in the direction of the x-axis), and a mounting groove 157c is formed in the rear surface of the lower grip-side rubber support 157 and extends in the lateral direction (in the direction of the x-axis). The torsion bar 161 has a horizontally extending lower-side straight portion 161a and a horizontally extending upper-side straight portion 161b. The lower-side straight portion 161a is fitted in the mounting groove 153c of the lower covering-side rubber support 153, and the upper-side straight portion 161b is fitted in the mounting groove 157c of the lower grip-side rubber support 157. In this state, a bar cover 163 is fixed on the lower surface of the covering-side rubber support 153 and the rear surface of the grip-side rubber support 157, so that the torsion bar 161 is held within the grooves. Specifically, the torsion bar 161 is disposed in such a manner as to bridge the covering-side rubber support 153 and the grip-side rubber support 157.

The torsion bar 161 mounted as described above can rotate in the longitudinal direction of the tool body around the lower-side straight portion 161a fitted in the mounting groove 153c of the covering-side rubber support 153. Further, the upper and lower straight portions 161a, 161b can slide with respect to the mounting grooves 153c, 157c in the extending direction of the mounting grooves 153c, 157c, and the upper-side straight portion 161b can slide in the vertical direction with respect to the mounting groove 157c of the grip-side rubber support 157. Thus, the torsion bar 161 allows the handgrip 109 to move in all directions (the directions of z-, y- and x-axes) with respect to the covering member 151 via the vibration-proofing part 159.

Further, the upper and lower straight portions 161a, 161b fitted in the mounting grooves 153c, 157c of the covering-side and grip-side rubber supports 153, 157 are held in surface (line) contact with the wall surfaces of the mounting grooves 153c, 157c and a wall surface of the bar cover 163, so that the torsion bar 161 prevents the handgrip 109 from rotating on the y-axis with respect to the covering member 151.

Therefore, according to this embodiment, during operation by the hammer drill 101, when the handgrip 109 which is connected to the covering member 151 via the vibration-proofing parts 159 is acted upon by a force of rotation around the longitudinal direction of the handgrip 109 or on the y-axis, which may cause elastic deformation of the elastic rubbers 152 and thus rotation of the handgrip 109, the torsion bar 161 exerts a force against this force of rotation on the y-axis. Thus, the relative rotation of the handgrip 109 on the y-axis can be prevented. As a result, useless relative movement between the handgrip 109 and the body 103 can be prevented, so that the workability can be improved.

(Third Embodiment of the Invention)

Figure 10:
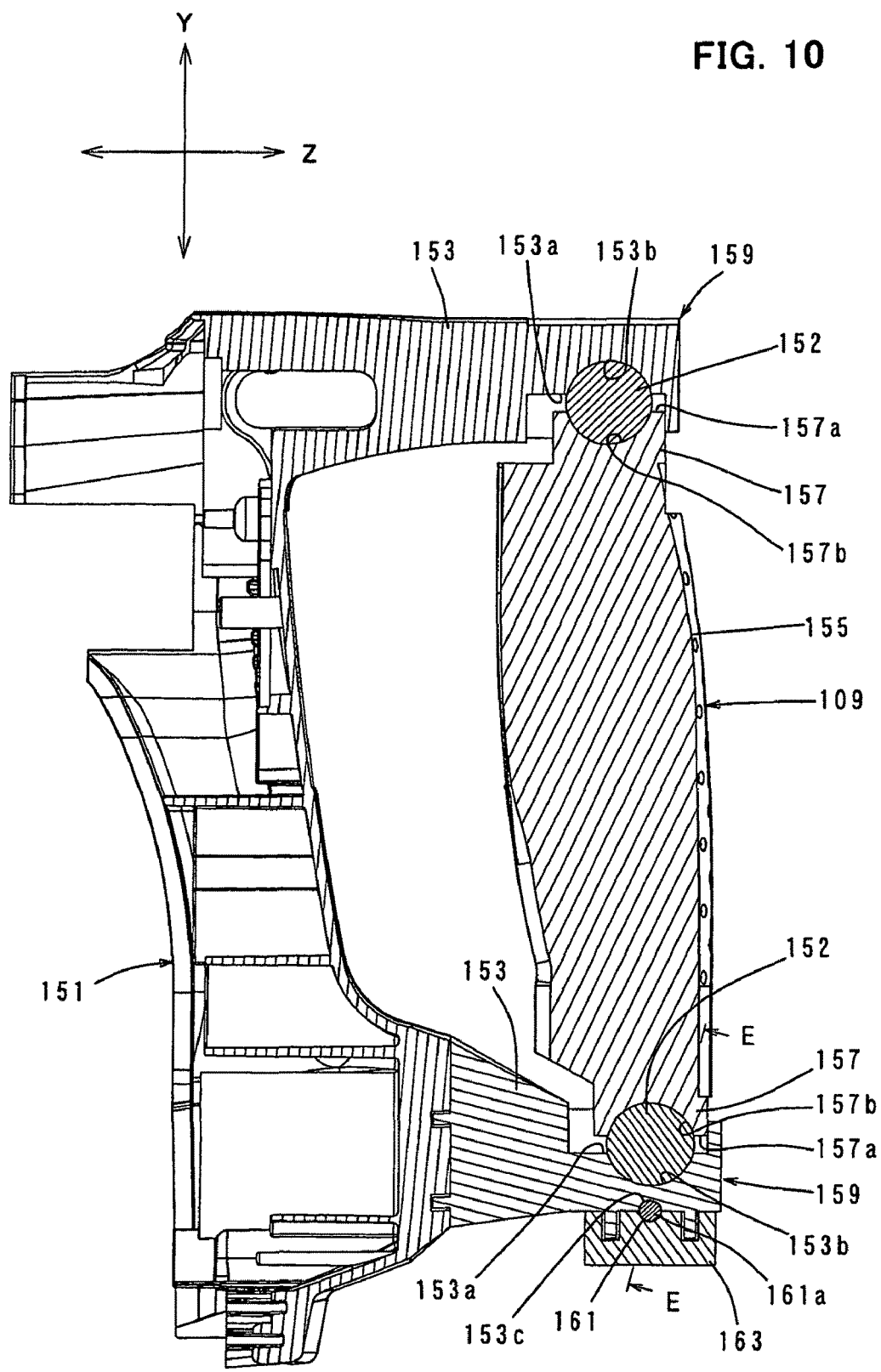
FIG. 10 is a vertical sectional view showing a D-shaped handle according to a third embodiment of this invention.
Figure 11:
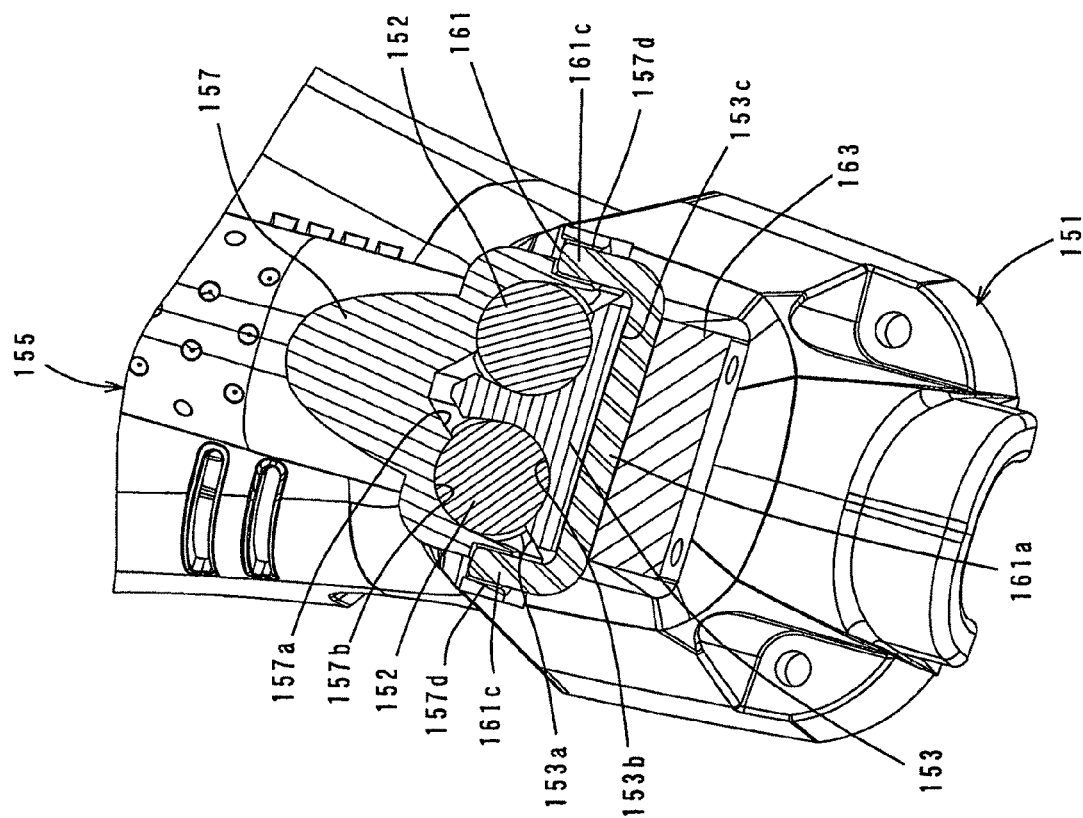
FIG. 11 is a sectional view taken along line E-E in FIG. 10.
Figure 11:
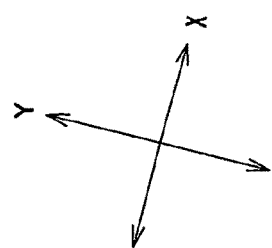

A third embodiment of the present invention is now described with reference to FIGS. 10 and 11. This embodiment is a modification to the torsion bar 161 of the second embodiment. FIG. 10 is a vertical sectional view showing a D-shaped handle having the handgrip 109 connected to the covering member 151 via the upper and lower vibration-proofing parts 159, and FIG. 11 is a sectional view taken along line E-E in FIG. 10.

In this modification, the torsion bar 161 is formed by bending a round bar of spring material into a generally U-shape. The torsion bar 161 has the horizontally extending lower-side straight portion 161a and right and left vertical portions 161c extending straight upward from the ends of the lower-side straight portion 161a. The lower-side straight portion 161a is fitted in the mounting groove 153c of the covering-side rubber support 153, and the right and left vertical portions 161c are fitted in right and left vertically extending mounting grooves 157d which are formed in the grip-side rubber support 157. The other structures, such as the structure in which the torsion bar 161 allows the handgrip 109 to move in all directions (the directions of z-, y- and x-axes) with respect to the covering member 151 via the vibration-proofing parts 159, and the structure in which the torsion bar 161 is held by the bar cover 163, are substantially identical to those in the second embodiment.

Therefore, according to this embodiment, like in the second embodiment, the torsion bar 161 prevents the handgrip 109 from rotating on the y-axis with respect to the covering member 151 during operation of the hammer drill 101, so that the workability can be improved.

Further, in the second and third embodiments, the structure in which the handgrip 109 is connected to the covering member 151 via the upper and lower vibration-proofing parts 159 and the structure in which the torsion bar 161 prevents rotation of the handgrip 109 on the y-axis are described as being applied to a D-shaped main handle mounted to the rear of the body 103, but they may be applied not only to the D-shaped main handle, but to a D-shaped auxiliary handle mounted to a front region of the body 103. In the case of the auxiliary handle, the auxiliary handle is removably mounted on a front region of the body 103, or particularly, in FIG. 1, on a region of the body 103 in which an impact bolt 145 is housed or on the periphery of a barrel 103a. Therefore, the covering member 151 is configured to be mounted on the barrel 103a by using a known mounting means. The covering member 151 provided in the D-shaped auxiliary handle is a feature that corresponds to the "power tool body", and the "handle body" according to the claimed invention. Same, the handgrip 109 is a feature that corresponds to the "grip part" according to the claimed invention.

Further, in the second and third embodiments, the torsion bar 161 is provided in the lower vibration-proofing part 159, but it may be provided in the upper and lower vibration-proofing parts 159, or it may be provided only in the upper vibration-proofing part 159. Further, the shape of the torsion bar 161 is not limited to the rectangular shape or U-shape as shown, but it may be other shapes, such as H-shape.

(Fourth Embodiment of the Invention)

Figure 12:
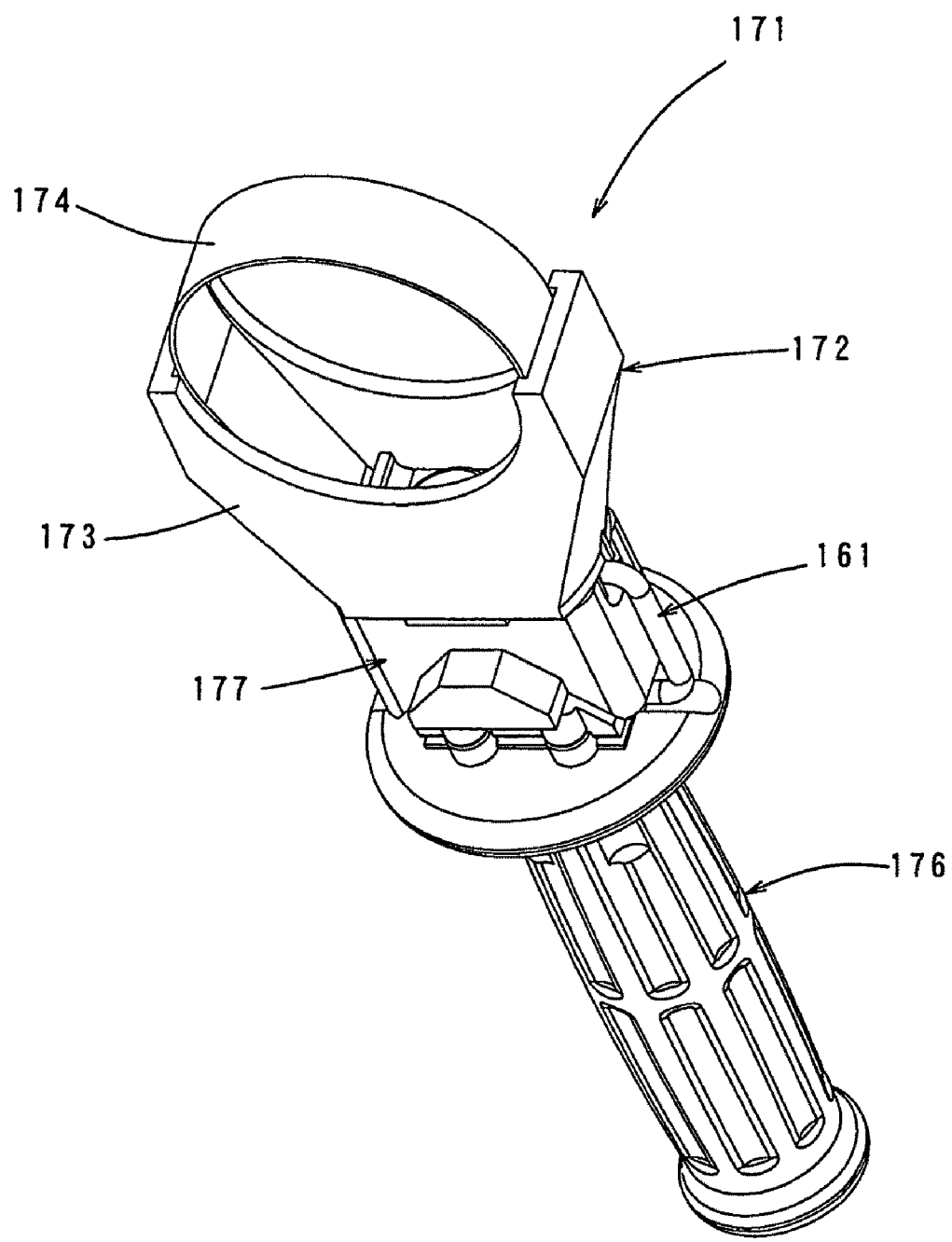
FIG. 12 is a perspective view showing a bar-shaped auxiliary handle according to a fourth embodiment of this invention.
Figure 13:
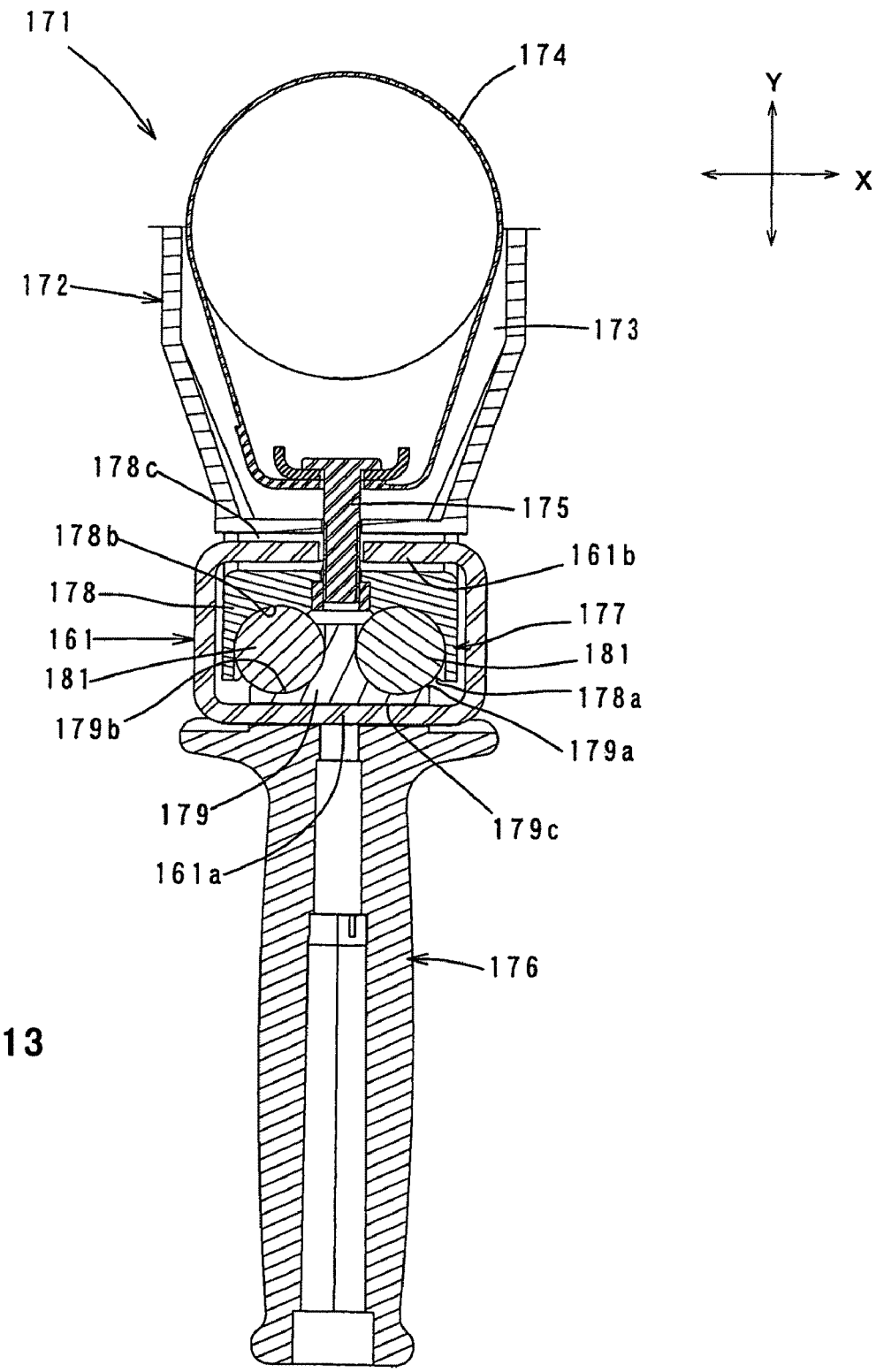
FIG. 13 is a vertical sectional view of the auxiliary handle.

A fourth embodiment of the present invention is now described with reference to FIGS. 12 and 13. This embodiment is applied to a bar-shaped auxiliary handle 171 which is removably mounted to the body 103. FIG. 12 is a perspective view showing the auxiliary handle 171, and FIG. 13 is a vertical sectional view of the auxiliary handle 171. The bar-shaped auxiliary handle 171 mainly includes a handle body 172 which is removably mounted to the barrel 103a of the body 103 (see FIG. 1), and a grip part 176 which is connected to the handle body 172 via a vibration-proofing part 177. The handle body 172 is removably mounted to the barrel 103a by a handle mounting means which includes a mounting member 173 that receives a lower peripheral region of the barrel 103a, a tightening band 174 that holds down an upper peripheral region of the barrel 103a, and a screw member 175 for tightening and loosening the tightening band 174 over the barrel 103a. The handle mounting means is not directly related to this invention, and therefore it is not described in further detail. The handle body 172 is a feature that corresponds to the "power tool body" according to the claimed invention.

The grip part 176 is a generally cylindrical member extending straight in the vertical direction (in the direction of the y-axis). One end (upper end) of the grip part 176 in its longitudinal direction (extending direction) is connected to the handle body 172 via the vibration-proofing part 177 for vibration reduction, and the other end (lower end) is a free end.

The vibration-proofing part 177 includes a rubber support 178 that is fixedly mounted on a lower end of the mounting member 173 of the handle body 172, a rubber support 179 that is opposed to the rubber support 178 and fixedly mounted on one end (upper end) of the grip part 176 in its longitudinal direction, and two elastic rubbers 181 that are held between the two rubber supports 178, 179. Thus, the grip part 176 is connected to the mounting member 173 such that it is allowed to move with respect to the mounting member 173 by elastic deformation of the elastic rubbers 181. Further, in this embodiment, a total of two right and left vibration-proofing parts 177 including the two elastic rubbers 181 and the handle body-side and grip-side rubber supports 178, 179 for supporting the elastic rubbers are provided on the opposite sides of the y-axis. The handle body-side rubber support 178 is a feature that corresponds to the "body-side receiving part", and the grip-side rubber support 179 to the "handle-side receiving part" and the "grip-side receiving part", and the elastic rubbers 181 to the "elastic element", according to this invention.

In this embodiment, when the grip part 176 moves with respect to the handle body 172, elastic deformation of the elastic rubbers 181 in the vibration-proofing part 177 includes shearing deformation in each of the directions of the z-, y- and x-axes (the longitudinal, vertical and lateral directions) which intersect with each other. Specifically, it is designed such that transmission of vibration from the handle body 172 to the grip part 176 can be reduced by utilizing a vibration damping action caused by shearing deformation of the elastic rubbers 152.

The construction of the vibration-proofing part 177 provided for this purpose is now described in detail. In the vibration-proofing part 177, mating surfaces 178a, 179a of the handle body-side and grip-side rubber supports 178, 179 are opposed with each other in the vertical direction and are generally inverted V-shaped as viewed from the direction of the z-axis. Specifically, the handle body-side and grip-side rubber supports 178, 179 have respective mating surfaces 178a, 179a opposed to each other via the elastic rubbers 181.

In the vibration-proofing part 177, the direction of the normal to the mating surface 178a of the handle body-side rubber support 178 coincides with the direction of the normal to the mating surface 179a of the grip-side rubber support 179. Further, each of the mating surfaces 178a, 179a of the handle body-side and grip-side rubber supports 178, 179 in the vibration-proofing part 177 has a straight inclined surface formed such that the direction of the normal to the mating surfaces 178a, 179a is orthogonally crossed to the z-axis and obliquely crossed at a predetermined angle (for example, approximately 45 degrees) to the x- and y-axes (see FIG. 13). Further, the mating surfaces 178a, 179a (inclined surfaces) of the handle body-side and grip-side rubber supports 178, 179 in the vibration-proofing part 177 are formed symmetrically with respect to the y-axis.

Further, the mating surfaces 178a, 179a of the handle body-side and grip-side rubber supports 178, 179 are opposed to each other with a predetermined clearance. Generally semispherical engagement recesses 178b, 179b are formed in the mating surfaces 178a, 179a, respectively, and the ball-like elastic rubbers 181 are held and supported between the engagement recesses 178b, 179b.

Further, in order to prevent rotation of the grip part 176 on the y-axis, the torsion bar 161 is provided between the handle body-side rubber support 178 and the grip-side rubber support 179 in such a manner as to bridge them. Mounting grooves 178c, 179c are formed in a region of connection of the handle body-side rubber support 178 with the handle body 162 and in a region of connection of the grip-side rubber support 179 with the grip part 176, respectively, and extend straight in the lateral direction (in the direction of the x-axis). The torsion bar 161 is formed by bending a round bar of spring material into a generally rectangular shape and has the lower-side straight portion 161a and the upper-side straight portion 161b. The torsion bar 161 is mounted with the upper-side straight portion 161b fitted in the mounting groove 178c of the handle body-side rubber support 178 and with the lower-side straight portion 161a fitted in the mounting groove 179c of the grip-side rubber support 179.

The torsion bar 161 mounted as described above can rotate around the upper-side straight portion 161b in the longitudinal direction of the tool body. Further, the upper and lower straight portions 161a, 161b can slide with respect to the mounting grooves 178c, 179c in the extending direction of the mounting grooves 178c, 179c, and the upper-side straight portion 161b can slide in the vertical direction with respect to the mounting groove 178c of the handle body-side rubber support 178. Thus, the torsion bar 161 allows the grip part 176 to move in all directions (the directions of z-, y- and x-axes) with respect to the handle body 172 via the vibration-proofing part 177.

Further, the upper and lower straight portions 161a, 161b fitted in the mounting grooves 178c, 179c of the handle body-side and grip-side rubber supports 178, 179 are held in surface (line) contact with the wall surfaces of the mounting grooves 178c, 179c, so that the torsion bar 161 prevents the grip part 176 from rotating on the y-axis with respect to the handle body 172.

The auxiliary handle 171 according to this embodiment is constructed as described above and mounted in use to the barrel 103a of the hammer drill 101. During hammer drill operation, impulsive and cyclic vibration caused in the body 103 is inputted (transmitted) from the body 103 to the grip part 176 via the handle body 172, but this transmission of vibration is reduced by elastic deformation, or shearing deformation including compressive deformation, of the elastic rubbers 181 in the vibration-proofing part 171.

In this embodiment, the mating surfaces 178a, 179a of the handle body-side and grip-side rubber supports 178, 179 are formed such that the direction of the normal to the mating surfaces is orthogonal to the z-axis (i.e. the direction of the planes of the mating surfaces 178a, 179a is parallel to the z-axis). Therefore, when vibration is inputted from the body 103 to the grip part 176 via the handle body 172 in the direction of the z-axis, the handle body-side rubber support 178 and the grip-side rubber support 179 move with respect to each other in the direction of the z-axis, and as a result, the elastic rubbers 181 are acted upon by a force mainly in the direction of shearing deformation via spherical contact surfaces of the engagement recesses 178b, 179b. Specifically, when vibration is inputted to the elastic rubbers 181 in the direction of the z-axis, elastic deformation of the elastic rubbers 181 appears mainly in the form of shearing deformation (partly including compressive deformation), and transmission of vibration from the body 103 to the grip part 176 via the handle body 172 can be reduced by a vibration damping action caused by this shearing deformation. Here, the force in the direction of shearing deformation includes a force in a linearly cutting direction or in a twisting-off direction. Thus, according to this embodiment, it is designed such that the elastic deformation of the elastic rubbers 181 significantly appears in the form of shearing deformation in the direction of the z-axis or the direction of the striking movement of the hammer bit 119 in which vibration reduction is highly required. With this construction, the effect of reducing vibration of the grip part 176 in the direction of the z-axis can be efficiently secured.

Further, each of the mating surfaces 178a, 179a of the handle body-side and grip-side rubber supports 178, 179 has an inclined surface formed such that the direction of the normal to the mating surfaces 178a, 179a is obliquely crossed at a predetermined angle to the x- and y-axes. Therefore, when vibration is caused in the body 103 in the direction of the y-axis (vertical direction) or the direction of the x-axis (lateral direction) and inputted to the elastic rubbers 181, the handle body-side rubber support 178 and the grip-side rubber support 179 move with respect to each other in the direction of the y-axis or the x-axis, and as a result, the elastic rubbers 181 are acted upon by forces in the compressing direction and the shearing direction via spherical contact surfaces of the engagement recesses 178b, 179b. Specifically, when vibration is inputted to the elastic rubbers 181 in the direction of the y-axis or the x-axis, deformation of the elastic rubbers 181 appears in the both forms of compressive deformation and shearing deformation. The elastic rubbers 181 have lower shearing stiffness compared with their compressive stiffness. Therefore, in the directions of the y- and x-axes, both the effect of reducing vibration of the grip part 176 by shearing deformation of the elastic rubbers 181 and the effect of preventing wobble of the grip part 176 by compressive deformation can be obtained. Further, by the wobble preventing effect, operational stability (operability) can be ensured.

As described above, the elastic rubbers 181 have lower shearing stiffness compared with their compressive stiffness, so that a higher vibration reducing effect can be obtained by shearing deformation than by compressive deformation. According to this embodiment, by utilizing this property of the elastic rubbers 181, it is designed such that shearing deformation appears in the elastic rubbers 181 in the three directions of the z-, y- and x-axes. With this construction, the effect of reducing vibration of the grip part 176 by utilizing shearing deformation of the elastic rubbers 181 can be obtained in the three directions of the z-, y- and x-axes, or substantially in all directions including syntheses of the directions of the z-, y- and x-axes.

Further, according to this embodiment, during operation by the hammer drill 101, when the grip part 176 which is connected to the handle body 172 via the vibration-proofing part 177 is acted upon by a force of rotation around the longitudinal direction of the grip part 176 or on the y-axis, which may cause elastic deformation of the elastic rubbers 181 and thus rotation of the grip part 176, the torsion bar 161 exerts a force against this force of rotation on the y-axis. Thus, the relative rotation of the grip part 176 on the y-axis can be prevented. As a result, useless relative movement between the grip part 176 and the handle body 172 can be prevented, so that the workability can be improved.

Further, according to this embodiment, in the vibration-proofing parts 159, even if viewed from any section, the elastic rubbers 152 are disposed between the covering-side rubber supports 153 and the grip-side rubber supports 157 in the directions of the z-, y- and x-axes. Therefore, transmission of vibration from the body 103 to the handgrip 109 can be rationally reduced in all of the directions of the z-, y- and x-axes by shearing deformation of the elastic rubbers 152.

(Fifth Embodiment of the Invention)

Figure 14:
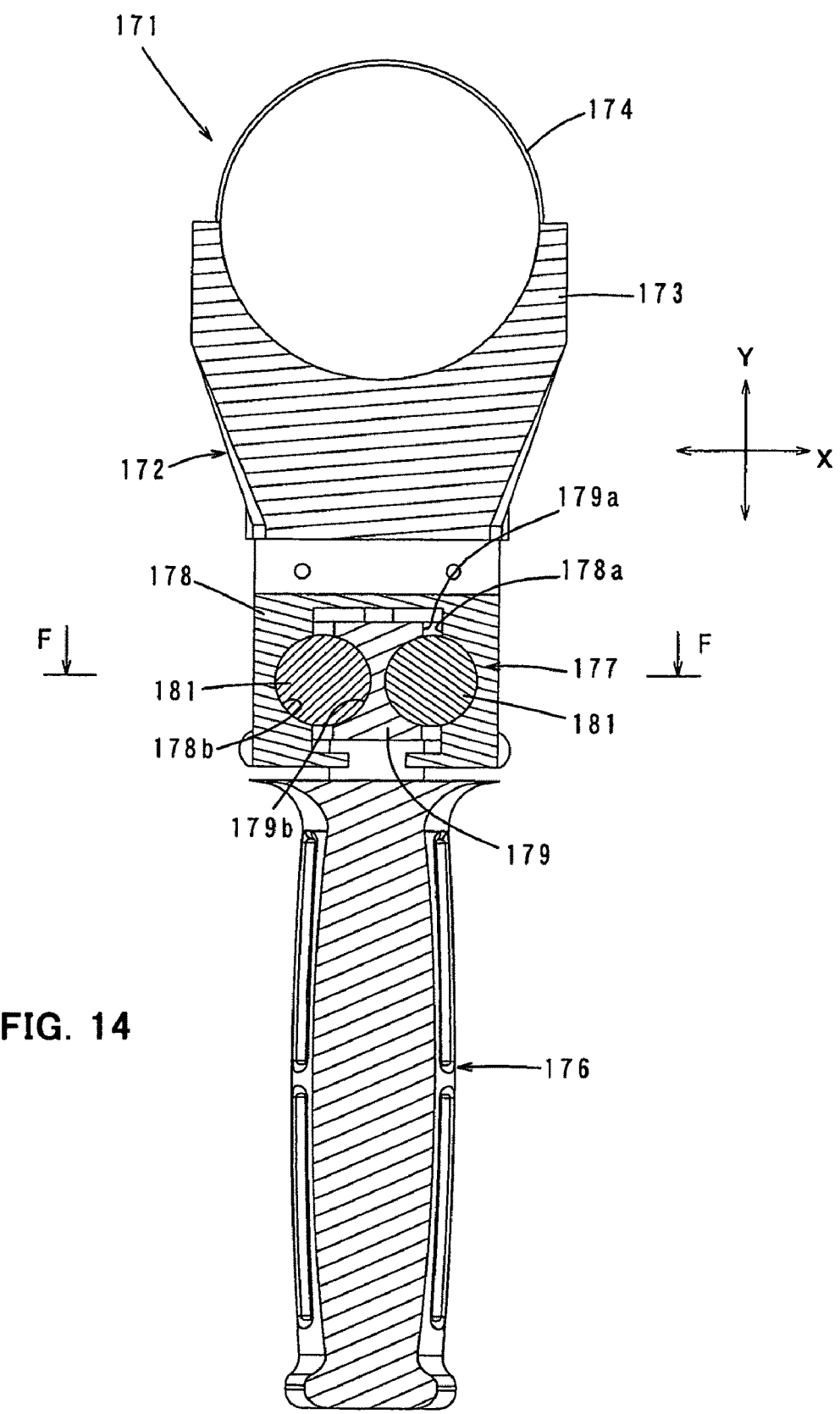
FIG. 14 is a vertical sectional view showing a bar-shaped auxiliary handle according to a fifth embodiment of this invention.
Figure 15:
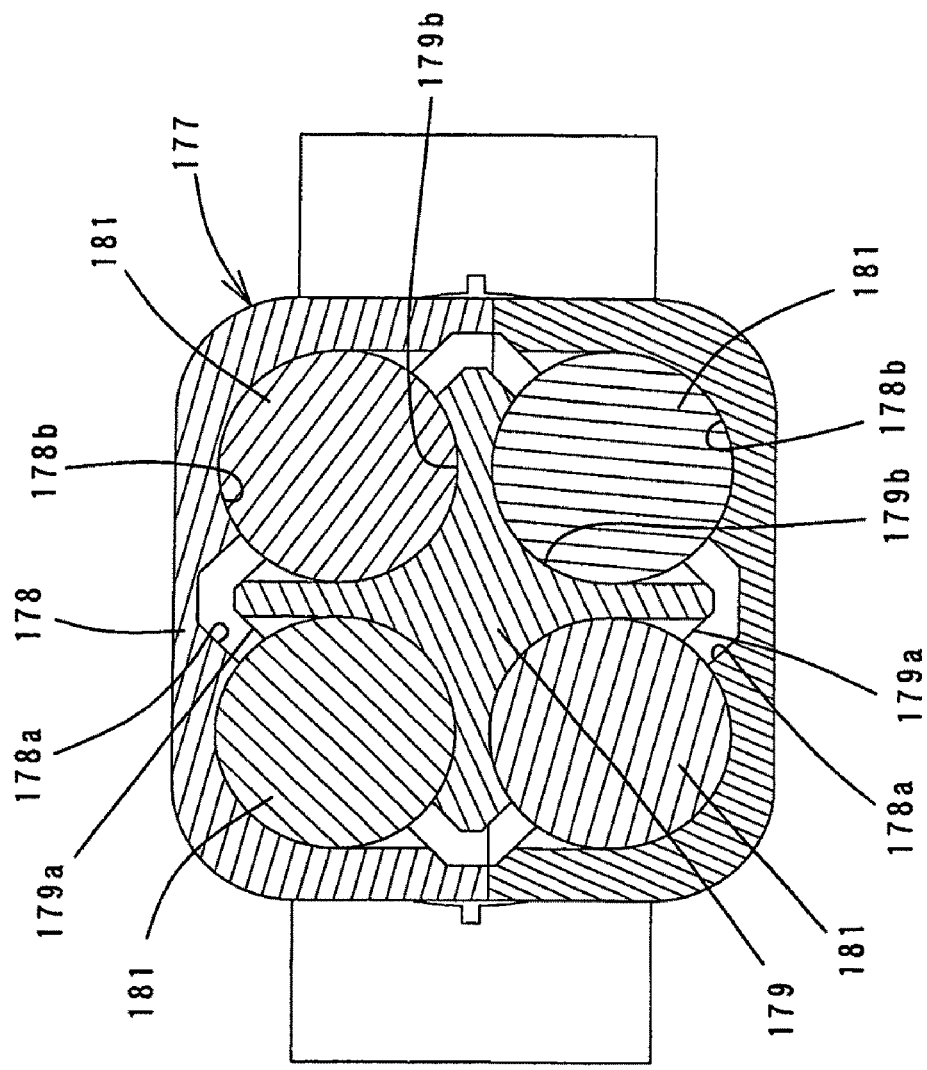
FIG. 15 is a sectional view taken along line F-F in FIG. 14.

A fifth embodiment of the present invention is now described with reference to FIGS. 14 and 15. This embodiment is a modification to the fourth embodiment. FIG. 14 is a vertical sectional view of the auxiliary handle 171, and FIG. 15 is a sectional view taken along line F-F in FIG. 14. As shown, in this embodiment, four elastic rubbers 181 are disposed on the opposite sides of the z- and x-axes, and the handle body-side and grip-side rubber supports 178, 179 have four respective mating surfaces 178a, 179a opposed to each other. In the mating surfaces 178a, 179a, generally semi-spherical engagement recesses 178b, 179b for supporting the elastic rubbers 181 are formed. Further, each of the mating surfaces 178a, 179a has an inclined surface formed such that the direction of the normal to the mating surfaces 178a, 179a is orthogonally crossed to the y-axis (so that the direction of the planes of the mating surfaces 178a, 179a is parallel to the y-axis) and obliquely crossed at a predetermined angle (for example, approximately 45 degrees) to the z- and x-axes. In the other points, it has the same construction as the fourth embodiment.

With the vibration proofing structure constructed as described above according to this embodiment, substantially the same vibration proofing effect as the fourth embodiment can be obtained.

Sixth Embodiment of the Invention

Figure 16:
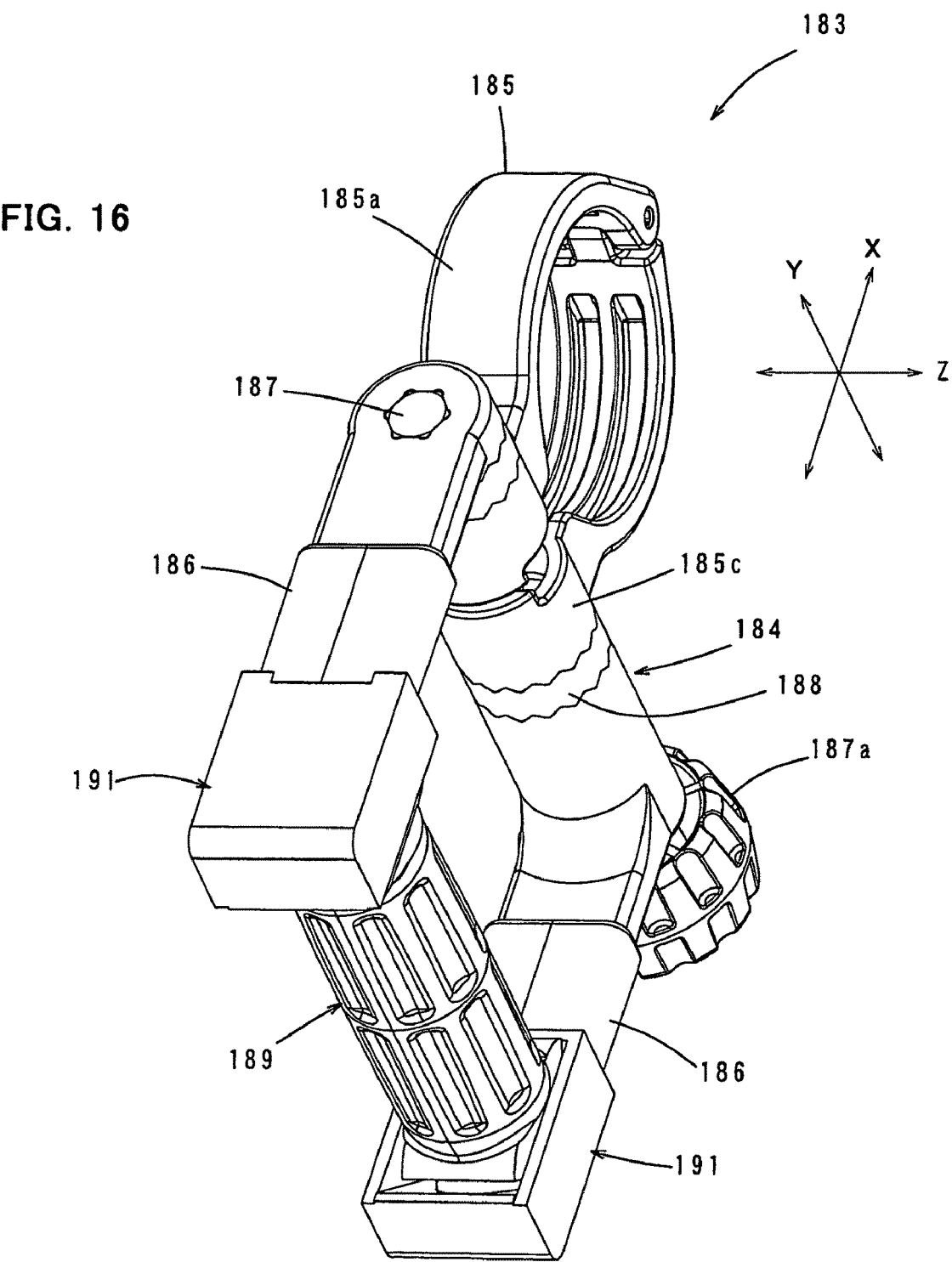
FIG. 16 is a perspective view showing a D-shaped auxiliary handle according to a sixth embodiment of this invention.
Figure 17:
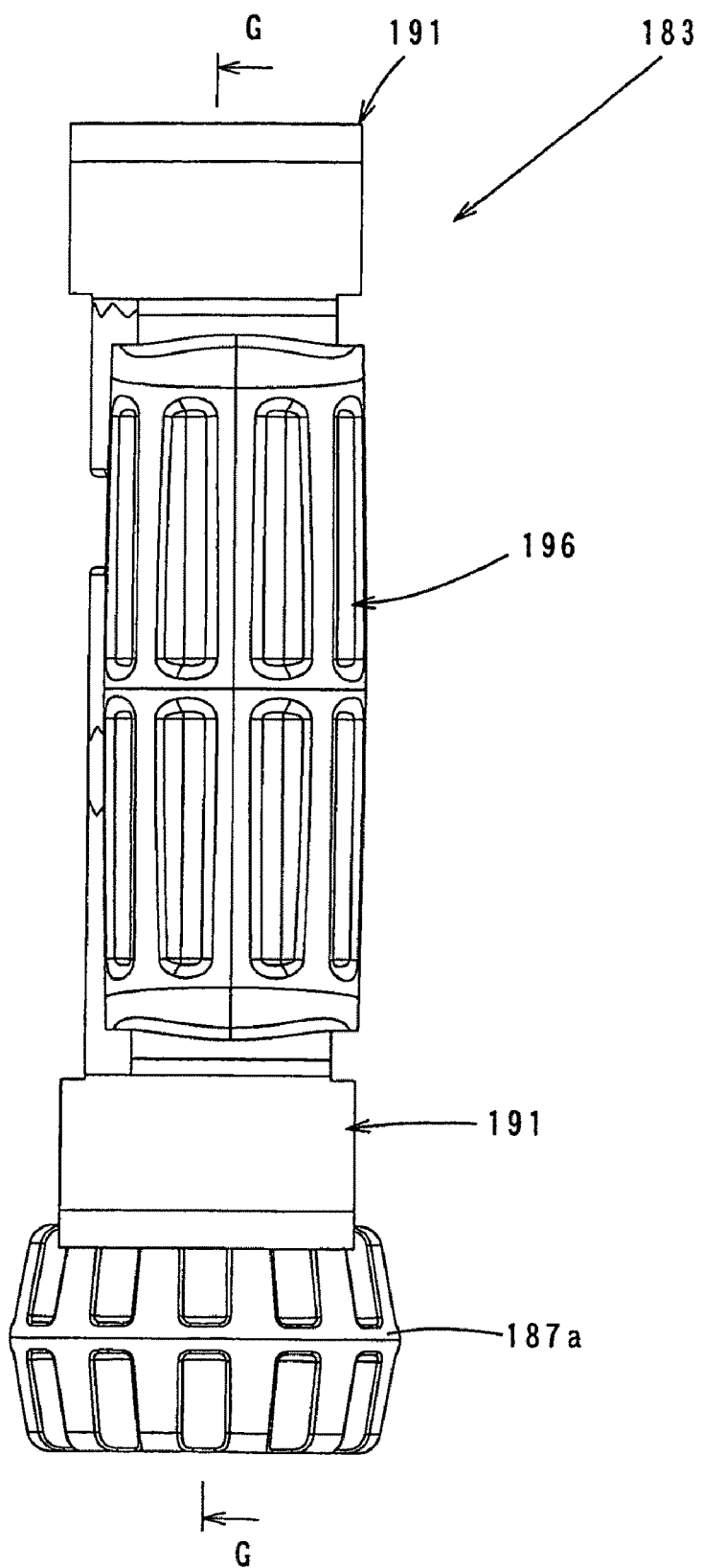
FIG. 17 is a side view of the D-shaped auxiliary handle.
Figure 18:
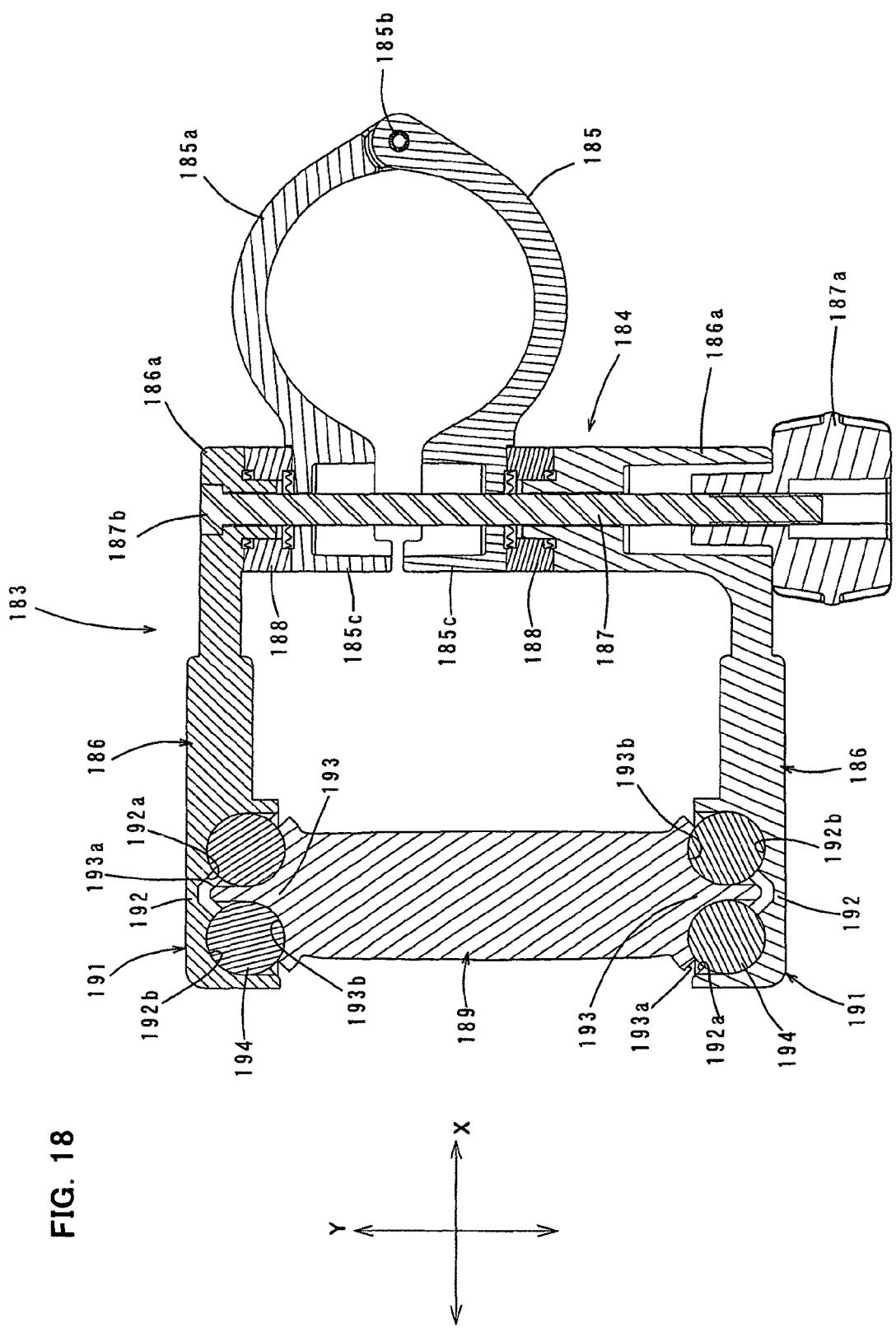
FIG. 18 is a sectional view taken along line G-G in FIG. 17.

A sixth embodiment of the present invention is now described with reference to FIGS. 16 to 18. This embodiment is applied to a D-shaped auxiliary handle 183 which is removably mounted to the barrel 103a of the body 103. In the auxiliary handle 183, transmission of vibration to a grip part 189 and a handle body 184 is reduced in the three directions of the z-, y- and x-axes by utilizing a vibration damping action caused by shearing deformation of elastic rubbers. FIG. 16 is a perspective view showing the D-shaped auxiliary handle 183, FIG. 17 is a side view of the D-shaped auxiliary handle 183, and FIG. 18 is a sectional view taken along line G-G in FIG. 17.

The D-shaped auxiliary handle 183 mainly includes a handle body 184 which is removably mounted to the barrel 103a of the body 103 (see FIG. 1), and a grip part 189 which is connected to the handle body 184 via a vibration-proofing part 191. The handle body 184 mainly includes a mounting part in the form of a ring-like member 185 which is mounted on the outer circumferential surface of the barrel 103a in such a manner as to hold the barrel 103a, connecting parts in the form of upper and lower arms 186 which connect the ring-like member 185 and the grip part 189, a clamping means in the form of a clamping bolt 187 and an adjustment knob 187a which serves to clamp and loosen the ring-like member 185 with respect to the barrel 103a, and upper and lower cam rings 188 which are disposed between the ring-like member 185 and the arms 186 and serve to allow adjustment of the working position of the grip part 189.

The ring-like member 185 includes two semi-circular arc elements 185a and is formed by connecting one end of each of the semi-circular arc elements 185a to one end of the other so as to be rotatable with respect to each other via a shaft 185b which extends parallel to the longitudinal direction of the barrel 103a (to the z-axis). The other ends (free ends) 185c of the semi-circular arc elements 185a are disposed between the cam rings 188 and between ends (cylindrical bases) 186a of the arms 186 in such a manner as to be held from the direction of the tangent to the ring-like member 185 (the direction of the y-axis). The ends 186a of the arms 186, the cam rings 188 and the other ends 185c of the ring-like member 185 which are disposed as described above have respective holes, and the clamping bolt 187 is loosely inserted through these holes in the direction of the y-axis. The clamping bolt 187 has a head 187b on one end, and the head 187b engages with the end 186a of the one arm 186 so that the maximum insert position is defined. In this state, the other end of the clamping bolt 187 protrudes through the end 186a of the other arm 186, and the adjustment knob 187a is threadably mounted onto the protruding end of the clamping bolt 187. Further, the adjustment knob 187a is held in contact with the outer surface of the end 186a of the other arm 186.

When the adjustment knob 187a is turned in one direction (clamping direction), the clamping bolt 187 and the adjustment knob 187a cooperate to clamp the two arms 186 and move them toward each other. As a result, the other ends 185c of the ring-like member 185 are also moved toward each other via the cam rings 188 in a direction that lessens the diameter of the ring-like member 185. Thus, the ring-like member 185 is clamped onto the barrel 103a. When the adjustment knob 187a is turned in the other direction (loosening direction), clamping of the ring-like member 185 onto the barrel 103a is released.

A cam face having generally V-shaped indentations is formed in the both sides (both end surfaces in the axial direction) of each of the two cam rings 188. Cam faces having generally V-shaped indentations are correspondingly formed in the inner side of each of the ends 186a of the two arms 186 and in the outer side of each of the other ends 185c of the ring-like member 185 which face the cam faces of the cam rings 188. When the adjustment knob 187a is turned in the loosening direction, the engagement between the cam faces of the cam rings 188 and the cam faces of the ends 186a of the arms 186 is released. In this state, the position of the grip part 189 can be adjusted in the longitudinal direction of the body 103 (the direction of the z-axis) by turning the arms 186 on the axis of the clamping bolt 187 (on the y-axis).

The two upper and lower arms 186 extend horizontally (in the direction of the x-axis), and the grip part 189 is disposed between the extending ends or other ends of the arms 186. The grip part 189 vertically extends, and its upper and lower ends are connected to the other ends of the arms 186 via vibration-proofing parts 191. The structure of the connection via the vibration-proofing parts 191 is essentially the same as that of the above-described vibration-proofing parts 159 of the first embodiment.

As shown in the sectional view of FIG. 18, the upper and lower vibration-proofing parts 191 mainly include rubber supports 192 formed on the other ends of the upper and lower arms 186, rubber supports 193 formed on the ends of the grip part 189 in its longitudinal direction (in the vertical direction), and ball-like elastic rubbers 194 disposed between the rubber supports 192 and 193. The arm-side rubber supports 192 are features that correspond to the "body-side receiving part", and the grip-side rubber supports 193 to the "handle-side receiving part" and the "grip-side receiving part", and the elastic rubbers 194 to the "elastic element" according to this invention.

In this embodiment, when the grip part 189 moves with respect to the arms 186 (the handle body 184), elastic deformation of the elastic rubbers 194 in the vibration-proofing parts 191 includes shearing deformation in each of the directions of the z-, y- and x-axes (the longitudinal, vertical and lateral directions) which intersect with each other. Specifically, it is designed such that transmission of vibration from the handle body 184 to the grip part 186 can be reduced by utilizing a vibration damping action caused by shearing deformation of the elastic rubbers 194.

The construction of the vibration-proofing parts 191 provided for this purpose is now described in detail. In the upper vibration-proofing part 191, opposed mating surfaces 192a, 193a of the arm-side and grip-side rubber supports 192, 193 are generally inverted V-shaped as viewed from the direction of the z-axis, while, in the lower vibration-proofing part 191, opposed mating surfaces 192a, 193a of the arm-side and grip-side rubber supports 192, 193 are generally V-shaped as viewed from the direction of the z-axis. Specifically, the arm-side and grip-side rubber supports 192, 193 in the upper and lower vibration-proofing parts 191 have respective mating surfaces 192a, 193a opposed to each other via the elastic rubbers 194. In each of the upper and lower vibration-proofing parts 191, the direction of the normal to the mating surface 192a of the arm-side rubber support 192 coincides with the direction of the normal to the mating surface 193a of the grip-side rubber support 193. Further, each of the mating surfaces 192a, 193a of the arm-side and grip-side rubber supports 192, 193 in the vibration-proofing parts 191 has a straight inclined surface formed such that the direction of the normal to the mating surfaces 192a, 193a is orthogonally crossed to the z-axis and obliquely crossed at a predetermined angle (for example, approximately 45 degrees) to the x- and y-axes. Further, the mating surfaces 192a, 193a (inclined surfaces) of the arm-side and grip-side rubber supports 192, 193 in the vibration-proofing parts 191 are formed symmetrically with respect to the y- and x-axes.

Further, the mating surfaces 192a, 193a of the arm-side and grip-side rubber supports 192, 193 in the upper and lower vibration-proofing parts 191 are opposed to each other with a predetermined clearance. Generally semispherical engagement recesses 192b and 193b are formed in the mating surfaces 192a and 193a, respectively, and the ball-like elastic rubbers 194 are held and supported between the engagement recesses 192b, 193b.

The D-shaped auxiliary handle 183 according to this embodiment is constructed as described above and mounted in use to the barrel 103a of the hammer drill 101. During hammer drill operation, impulsive and cyclic vibration caused in the body 103 is inputted (transmitted) from the body 103 to the grip part 189 via the arms 186 of the handle body 184, but this transmission of vibration is reduced by elastic deformation, or shearing deformation including compressive deformation, of the elastic rubbers 194 in the vibration-proofing parts 191.

In this embodiment, the mating surfaces 192a, 193a of the arm-side and grip-side rubber supports 192, 193 are formed such that the direction of the normal to the mating surfaces 192a, 193a is orthogonal to the z-axis (i.e. the direction of the planes of the mating surfaces 192a, 193a is parallel to the z-axis). Therefore, when vibration is inputted from the body 103 to the grip part 189 via the arms 186 in the direction of the z-axis, the arm-side rubber supports 192 and the grip-side rubber supports 179 move with respect to each other in the direction of the z-axis, and as a result, the elastic rubbers 194 are acted upon by a force mainly in the direction of shearing deformation via spherical contact surfaces of the engagement recesses 192b, 193b. Specifically, when vibration is inputted to the elastic rubbers 194 in the direction of the z-axis, elastic deformation of the elastic rubbers 194 appears mainly in the form of shearing deformation (partly including compressive deformation), and transmission of vibration from the body 103 to the grip part 189 via the arms 186 of the handle body 184 can be reduced by a vibration damping action caused by this shearing deformation. Here, the force in the direction of shearing deformation includes a force in a linearly cutting direction or a force in a twisting-off direction.

Thus, according to this embodiment, it is designed such that the elastic deformation of the elastic rubbers 194 significantly appears in the form of shearing deformation in the direction of the z-axis or the direction of the striking movement of the hammer bit 119 in which vibration reduction is highly required. With this construction, the effect of reducing vibration of the grip part 189 in the direction of the z-axis can be efficiently secured.

Further, each of the mating surfaces 192a, 193a of the arm-side and grip-side rubber supports 192, 193 has an inclined surface formed such that the direction of the normal to the mating surfaces 192a, 193a is obliquely crossed at a predetermined angle to the x- and y-axes. Therefore, when vibration is caused in the body 103 in the direction of the y-axis (vertical direction) or the direction of the x-axis (lateral direction) and inputted to the elastic rubbers 194, the arm-side rubber supports 192 and the grip-side rubber supports 193 move with respect to each other in the direction of the y-axis or the x-axis, and as a result, the elastic rubbers 194 are acted upon by forces in the compressing direction and the shearing direction via spherical contact surfaces of the engagement recesses 192b, 193b. Specifically, when vibration is inputted to the elastic rubbers 194 in the direction of the y-axis or the x-axis, deformation of the elastic rubbers 194 appears in the both forms of compressive deformation and shearing deformation. The elastic rubbers 194 have lower shearing stiffness compared with their compressive stiffness. Therefore, in the directions of the y- and x-axes, both the effect of reducing vibration of the grip part 189 by shearing deformation of the elastic rubbers 194 and the effect of preventing wobble of the grip part 189 by compressive deformation can be obtained. Further, by the wobble preventing effect, operational stability (operability) can be ensured.

As described above, the elastic rubbers 194 have lower shearing stiffness compared with their compressive stiffness, so that a higher vibration reducing effect can be obtained by shearing deformation than by compressive deformation. According to this embodiment, by utilizing this property of the elastic rubbers 194, it is designed such that shearing deformation appears in the elastic rubbers 194 in the three directions of the z-, y- and x-axes. With this construction, the effect of reducing vibration of the grip part 189 by utilizing shearing deformation of the elastic rubbers 194 can be obtained in the three directions of the z-, y- and x-axes, or substantially in all directions including syntheses of the directions of the z-, y- and x-axes.

(Seventh Embodiment of the Invention)

Figure 19:
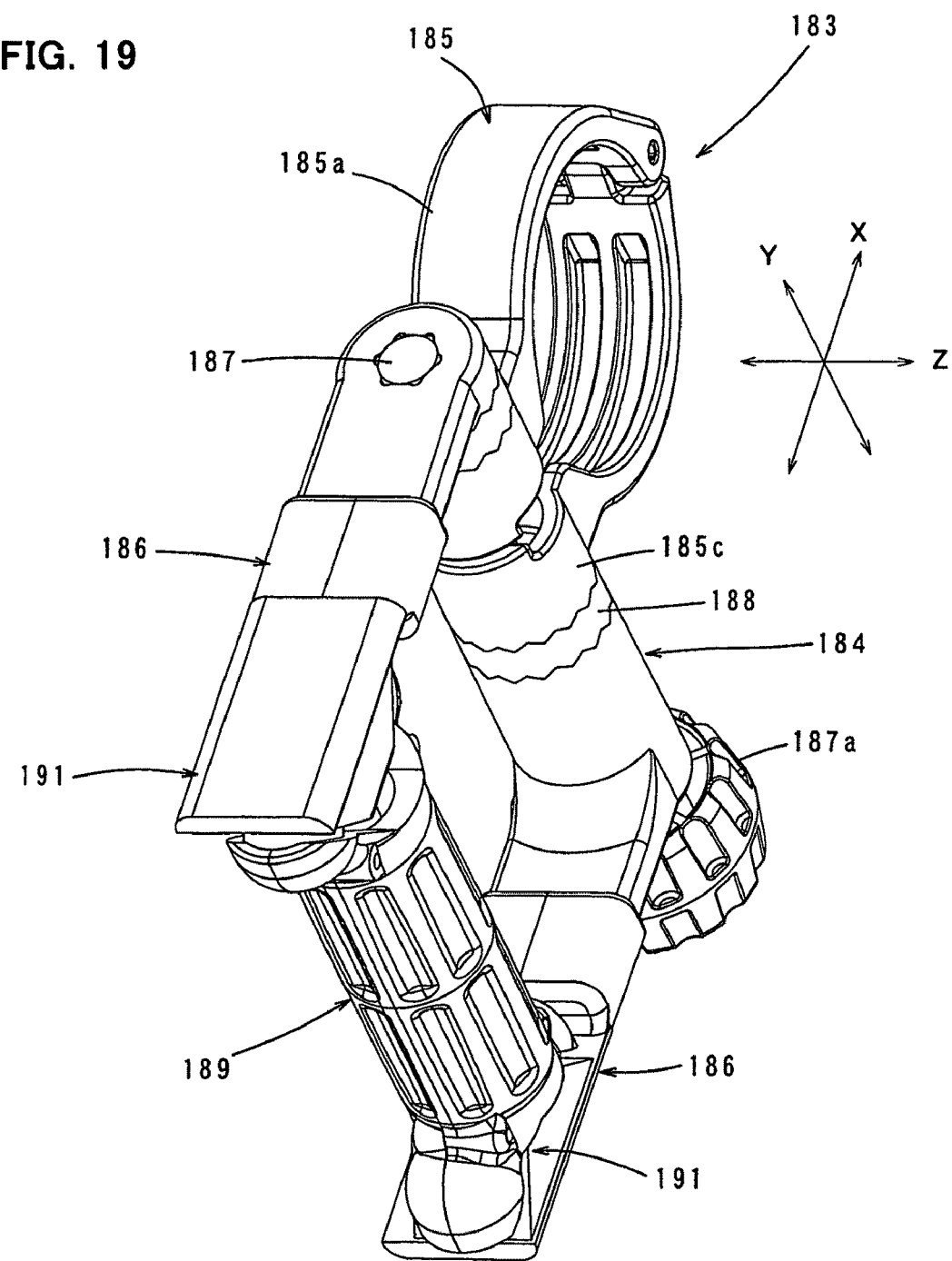
FIG. 19 is a perspective view showing a D-shaped auxiliary handle according to a seventh embodiment of this invention.
Figure 20:
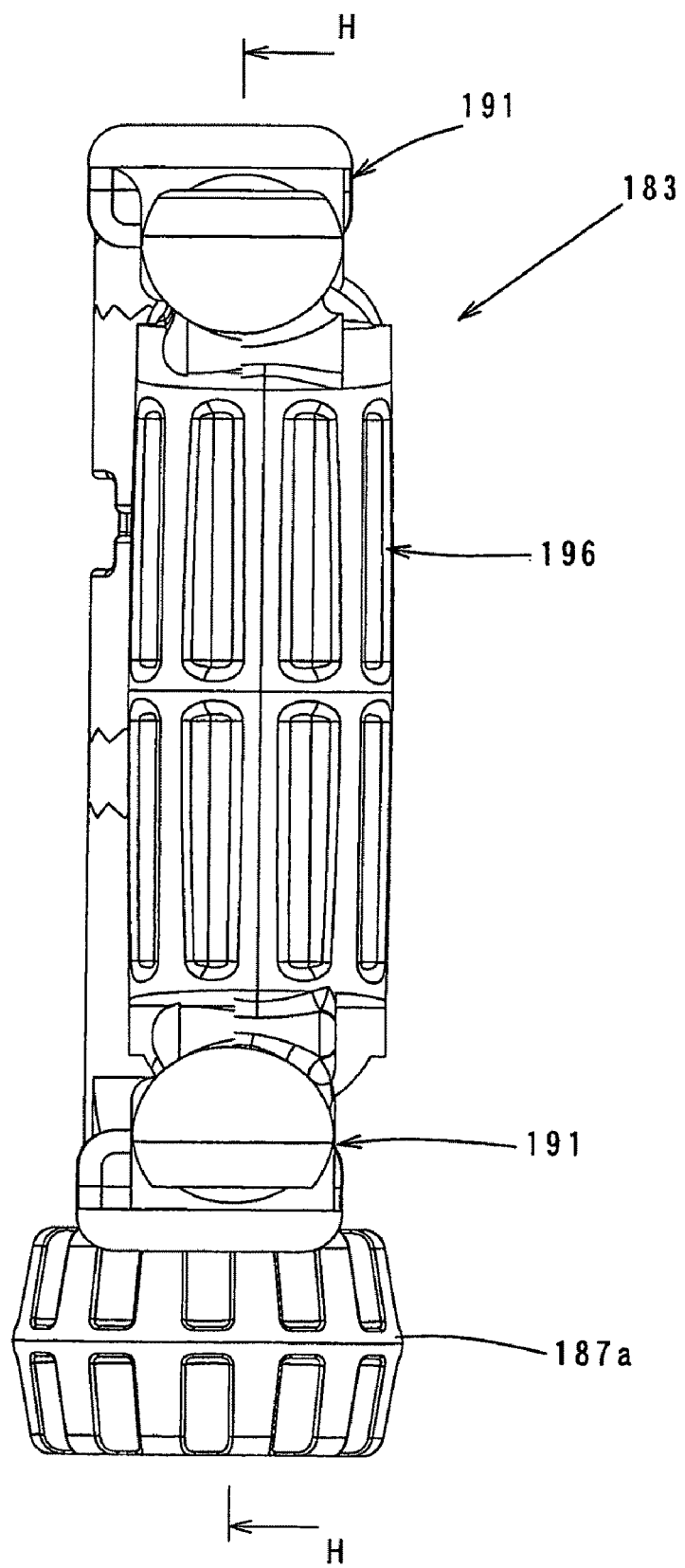
FIG. 20 is a side view of the D-shaped auxiliary handle.

A seventh embodiment of the present invention is now described with reference to FIGS. 19 to 21. This embodiment is a modification to the D-shaped auxiliary handle of the above-described sixth embodiment. FIG. 19 is a perspective view showing the D-shaped auxiliary handle 183, FIG. 20 is a side view of the D-shaped auxiliary handle 183, and FIG. 21 is a sectional view taken along line H-H in FIG. 20.

Figure 21:
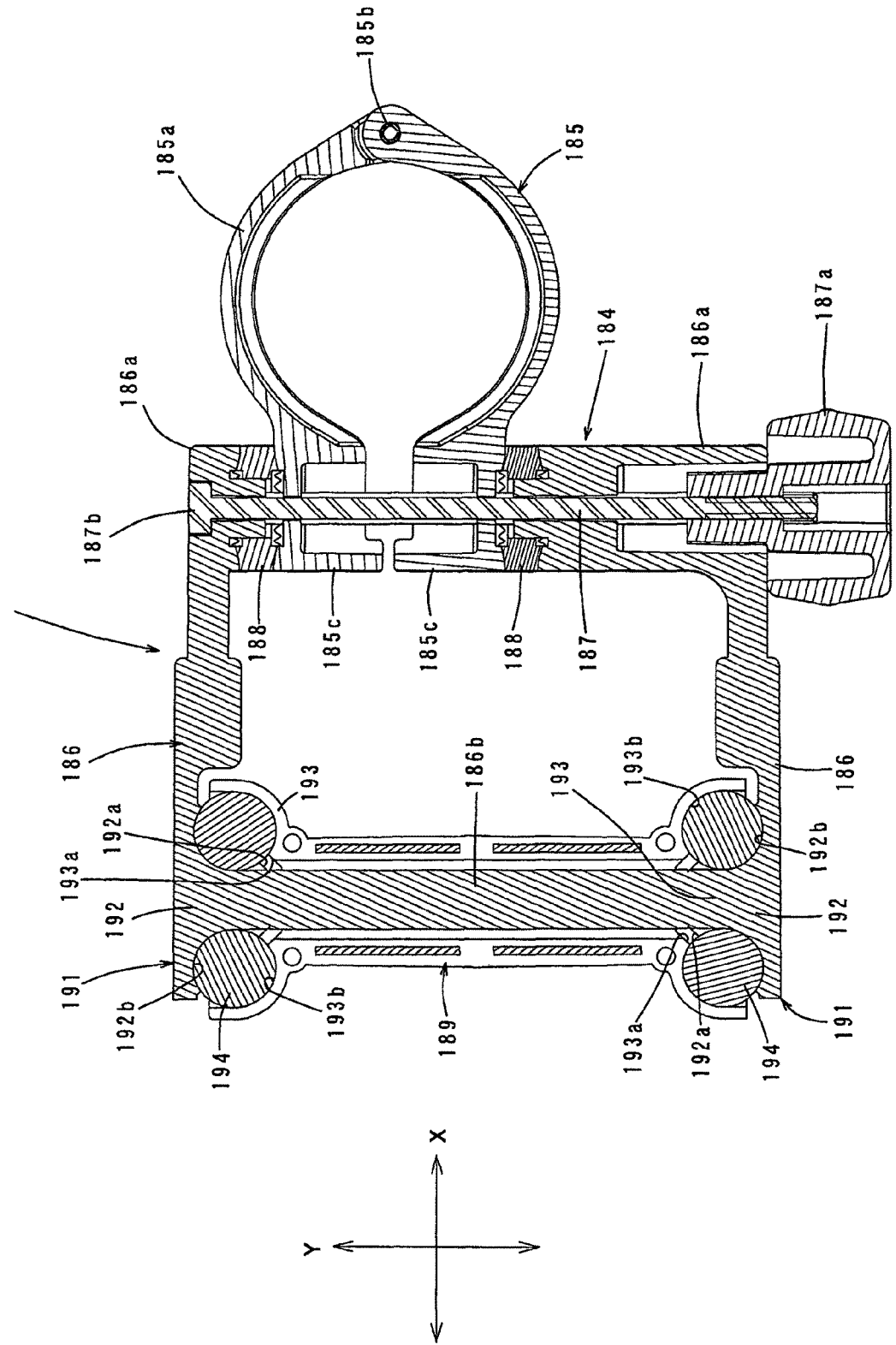
FIG. 21 is a sectional view taken along line H-H in FIG. 20.

In this embodiment, as shown in FIG. 21, the other ends of the upper and lower arms 186 or the arm-side rubber supports 192 are connected by a shaft-like part in the form of a core 186b extending through the inside of the grip part 189 in the vertical direction (the direction of the y-axis). In the other points, it has substantially the same construction as the above-described sixth embodiment. The core 186b may be integrally formed with the arms 186, or it may be separately formed and fixed to the arms 186 by screws or other fastening means. The grip part 189 has a hollow cylindrical shape and is connected to the arms 186 via the vibration-proofing parts 191. The vibration-proofing parts 191 include the aim-side rubber supports 192 formed on the other ends of the arms 186, the grip-side rubber supports 193 formed on the ends of the grip part 189 in its longitudinal direction, and the ball-like elastic rubbers 194 disposed between the rubber supports 192 and 193. The rubber supports 192, 193 are similarly constructed as those in the sixth embodiment. Components which are substantially identical to those in the sixth embodiment are given like numerals as in the sixth embodiment and will not be described.

The grip part 189 is formed by two front and rear semi-cylindrical halves. The two halves are fitted over the core 186b and joined together by appropriate joining means, so that the grip part 189 is mounted to the arms 186.

According to this embodiment having the above-described construction, as for reduction of vibration of the grip part 189, the same effect as the sixth embodiment can be obtained. In this embodiment, the upper and lower arms 186 are integrated by the core 186b which extends through the inside of the grip part 189. Thus, the connecting parts in the form of the arms 186 which connect the grip part 189 and the mounting part in the form of the ring-like member 185 to be mounted on the barrel 103a can be configured as a closed-loop structure. Therefore, the strength of the arms 186 can be increased compared with the sixth embodiment.

In the above-described embodiments, the electric hammer drill is described as a representative example of the hand-held power tool. However, the present invention is not limited to the electric hammer drill, but it can also be applied to a hammer which performs a chipping operation on a workpiece only by striking movement of a tool bit in the form of a hammer bit in its axial direction. Further, it can be applied not only to an impact power tool such as a hammer and a hammer drill, but to a cutting power tool, such as a reciprocating saw and a jig saw, which performs a cutting operation on a workpiece by reciprocating movement of a tool bit in the form of a blade.

Further, in the sixth and seventh embodiments, transmission of vibration to the grip part 189 and the handle body 184 is reduced in the three directions of the z-, y- and x-axes by utilizing a vibration damping action caused by shearing deformation of the elastic rubbers. In addition, it may be constructed such that the grip part 189 is prevented from rotating on the y-axis with respect to the arms 186 by using the torsion bar 161 described in the second and third embodiments.

DESCRIPTION OF NUMERALS

101 hammer drill (hand-held power tool)
103 body (power tool body)
103a barrel
105 motor housing
107 gear housing
109 handgrip
111 driving motor
113 motion converting mechanism
115 striking mechanism
117 power transmitting mechanism
119 hammer bit (tool bit)
129 piston
137 tool holder
141 cylinder
141a air chamber
143 striker
145 impact bolt
151 covering member
152 elastic rubber (elastic element)
153 covering-side rubber support (body-side receiving part)
153a mating surface
153b engagement recess
153c mounting groove
155 grip part
157 grip-side rubber support (handle-side receiving part)
157a mating surface
157b engagement recess
157c mounting groove
159 vibration-proofing part
161 torsion bar (rotation preventing mechanism) (different elastic element)
161a lower-side straight portion
161b upper-side straight portion
161c right or left vertical portion
163 bar cover
171 auxiliary handle
172 handle body
173 mounting member
174 tightening band
175 screw member
176 grip part
177 vibration-proofing part
178 handle body-side rubber support (body-side receiving part)
178a mating surface
178b engagement recess
178c mounting groove
179 grip-side rubber support (handle-side receiving part) (grip-side receiving part)
179a mating surface
179b engagement recess
179c mounting groove
181 elastic rubber (elastic element)
183 auxiliary handle
184 handle body
185 ring-like member
185a semi-circular arc element
185b shaft
185c other end
186 arm
186a one end (cylindrical base)
186b core
187 clamping bolt
187a adjustment knob
187b head
188 cam ring
189 grip part
191 vibration-proofing part
192 arm-side rubber support (body-side receiving part)
192a mating surface
192b engagement recess
193 grip-side rubber support (handle-side receiving part) (grip-side receiving part)
193a mating surface
193b engagement recess
194 elastic rubber (elastic element)

The invention claimed is:

1. A hand-held power tool, which performs a predetermined operation on a workpiece by linear movement of a tool bit in an axial direction of the tool bit, the hand-held power tool comprising:
a power tool body having a tip end region to which the tool bit can be mounted,
a handle that is mounted on the power tool body and designed to be held by a user, the handle comprising an auxiliary handle which is mounted to a front region of the power tool body,
an elastic element that is disposed between the power tool body and the handle and serves to reduce transmission of vibration from the power tool body to the handle,
a body-side receiving part that is provided on the power tool body and supports the elastic element,
a handle-side receiving part that is provided on the handle and supports the elastic element and
a vibration-proofing part formed by the elastic element, and the body-side and handle-side receiving parts which are opposed to each other so as to hold the elastic element, wherein
the vibration-proofing part is provided such that deformation of the elastic element appears in the form of shearing deformation in each of a direction of a z-axis defined along the axial direction of the tool bit and directions of a y-axis and an x-axis which respectively intersect with the z-axis, and
the vibration-proofing part includes a rotation preventing mechanism which allows the auxiliary handle to move with respect to the power tool body in the directions of the z-, y- and x-axes by deformation of the elastic element and prevents rotation of the auxiliary handle about the y-axis.

2. The hand-held power tool as defined in claim 1, wherein the handle further comprises a main handle that is disposed at a rear of the power tool body on a side opposite from the tool bit.

3. The hand-held power tool as defined in claim 2, wherein, in the vibration-proofing part, the elastic element is disposed between the body-side receiving part and the handle-side receiving part.

4. The hand-held power tool as defined in claim 2, wherein the main handle is connected to the power tool body by at least two vibration-proofing parts,
in each of the vibration-proofing parts, the body-side receiving part and the handle-side receiving part have respective mating surfaces which are opposed to each other via the elastic element, and
in each of the vibration-proofing parts, direction of a normal to the mating surface of the handle-side receiving part coincides with a direction of a normal to the mating surface of the body-side receiving part, and the direction of the normal to the mating surface of the handle-side receiving part and the mating surface of the body-side receiving part in one of the vibration-proofing parts is different from the direction of the normal to the mating surface of the handle-side receiving part and the mating surface of the body-side receiving part in the other vibration-proofing part.

5. The hand-held power tool as defined in claim 2, wherein the body-side receiving part and the handle-side receiving part in the vibration-proofing part have respective mating surfaces which are opposed to each other via the elastic element, and
each of the mating surfaces of the handle-side and body-side receiving parts has an inclined surface formed such that a direction of a normal to the mating surfaces is orthogonally crossed to the z-axis and obliquely crossed to the y- and x-axes.

6. The hand-held power tool as defined in claim 2, wherein the main handle extends in a vertical direction along the y-axis and is connected to the power tool body at upper and lower points in an extending direction on right and left sides of the y-axis by the vibration-proofing parts,
the body-side receiving part and the handle-side receiving part in each of the vibration-proofing parts have respective mating surfaces which are opposed to each other via the elastic element, and
directions of normals to the mating surfaces of the handle-side and body-side receiving parts of the upper and lower, right and left vibration-proofing parts are symmetrical with respect to the x-axis and the y-axis.

7. The hand-held power tool as defined in claim 2, wherein the rotation preventing mechanism comprises a different elastic element which is different from the elastic element and disposed in such a manner as to bridge the power tool body and at least one of the main handle and the auxiliary handle.

8. The hand-held power tool as defined in claim 1, wherein, in the vibration-proofing part, the elastic element is disposed between the body-side receiving part and the handle-side receiving part if viewed from any section in the directions of the z-, y- and x-axes.

9. The hand-held power tool as defined in claim 1, wherein the auxiliary handle is connected to the power tool body by at least two vibration-proofing parts,
in each of the vibration-proofing parts, the body-side receiving part and the handle-side receiving part have respective mating surfaces which are opposed to each other via the elastic element, and
in each of the vibration-proofing parts, a direction of a normal to the mating surface of the handle-side receiving part coincides with a direction of a normal to the mating surface of the body-side receiving part, and the direction of the normal to the mating surfaces of the handle-side receiving part and the body-side receiving part in one of the vibration-proofing parts is different from the direction of the normal to the mating surfaces of the handle-side receiving part and the body-side receiving part in the other vibration-proofing part.

10. The hand-held power tool as defined in claim 1, wherein
the body-side receiving part and the handle-side receiving part in the vibration-proofing part have respective mating surfaces which are opposed to each other via the elastic element, and
each of the mating surfaces of the handle-side and body-side receiving parts has an inclined surface formed such that a direction of a normal to the mating surfaces is orthogonally crossed to the z-axis and obliquely crossed to the y- and x-axes.

11. The hand-held power tool as defined claim 1, wherein the auxiliary handle extends in a vertical direction along the y-axis and is connected to the power tool body at upper and lower points in an extending direction on right and left sides of the y-axis,
the body-side receiving part and the handle-side receiving part in each of the vibration-proofing parts have respective mating surfaces which are opposed to each other via the elastic element, and
directions of normals to the mating surfaces of the handle-side and body-side receiving parts of the upper and lower, right and left vibration-proofing parts are symmetrical with respect to the x-axis and the y-axis.

12. The hand-held power tool as defined in claim 1, wherein the elastic element comprises a ball-like elastic rubber.

13. An auxiliary handle for use with a hand-held power tool which performs a predetermined operation on a workpiece by a tool bit, the auxiliary handle comprising:
a handle body which is removably mounted to a power tool body of the hand-held power tool,
a grip part which is connected to the handle body and designed to be held by a user,
an elastic element that is disposed between the handle body and the grip part and serves to reduce transmission of vibration from the handle body to the grip part,
a body-side receiving part that is provided on the handle body and supports the elastic element, and
a grip-side receiving part that is provided on the grip part and supports the elastic element, wherein:
a vibration-proofing part is formed by the elastic element and the body-side and grip-side receiving parts which are opposed to each other so as to hold the elastic element,
the vibration-proofing part is designed such that deformation of the elastic element appears in the form of shearing deformation in each of a direction of a z-axis defined along a longitudinal direction of the power tool body and directions of a y-axis and an x-axis which intersect with the z-axis,and
the grip part is connected at both ends in a longitudinal direction of the grip part to the handle body via two arms which extend in parallel to each other in a direction transerse to the longitudinal direction of the grip part.

14. The auxiliary handle as defined in claim 13, wherein one end of the grip part in the longitudinal direction is connected to the handle body, and the other end is free.

15. The auxiliary handle as defined in claim 13, wherein the elastic element comprises a ball-like elastic rubber.

16. The auxiliary handle as defined in claim 13, wherein the two arms are provided as components of the handle body and extend toward the grip part, and
the extending ends of the arms are connected to each other by a shaft-like part which extends through an inside of the grip part.

17. The auxiliary handle as defined claim 13, wherein the vibration-proofing part includes a rotation preventing mechanism which allows the grip part to move in the directions of the z-, y- and x-axes by deformation of the elastic element with respect to the handle body and prevents its rotation on the y-axis.

18. The auxiliary handle as defined in claim 17, wherein the rotation preventing mechanism comprises a different elastic element which is different from the elastic element and disposed in such a manner as to bridge the grip part and the handle body.

* * * * *